I. M. FINLEY.
FLYING MACHINE.
APPLICATION FILED JULY 20, 1918.
1,426,369.
Patented Aug. 22, 1922.
13 SHEETS—SHEET 1.
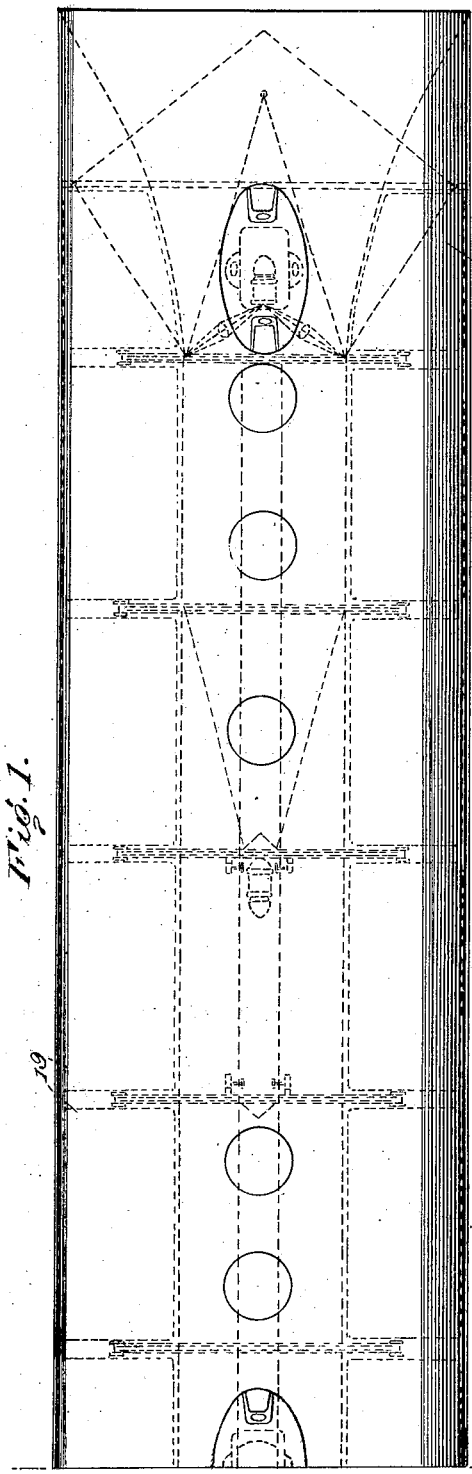
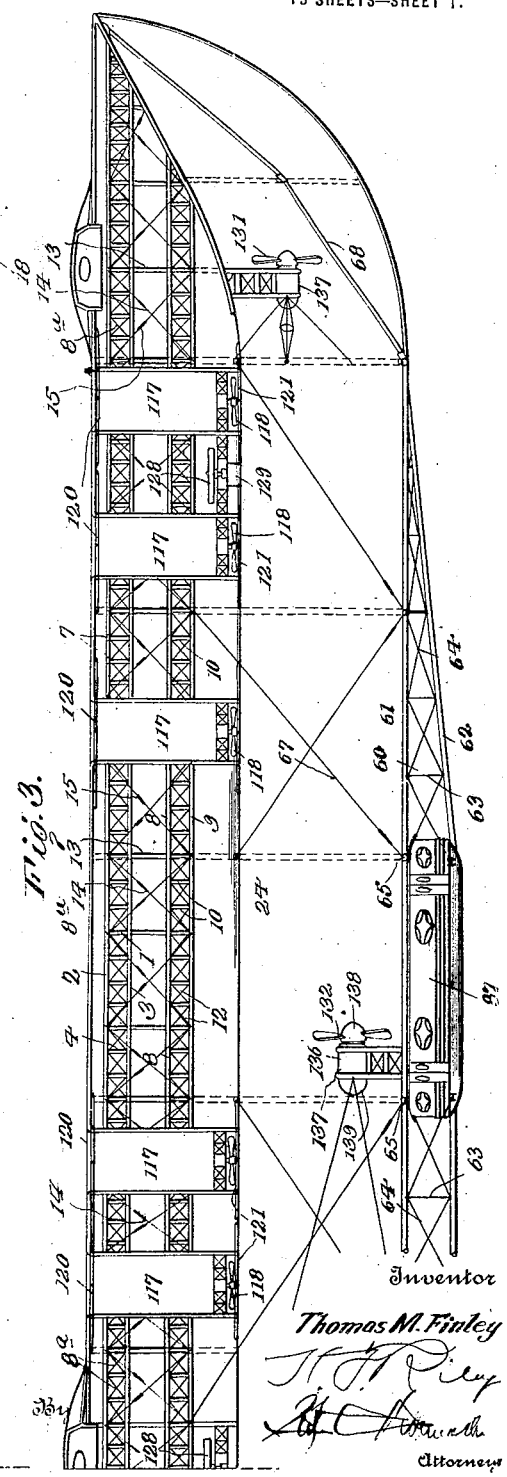
Inventor
Thomas M. Finley
By
Attorneys

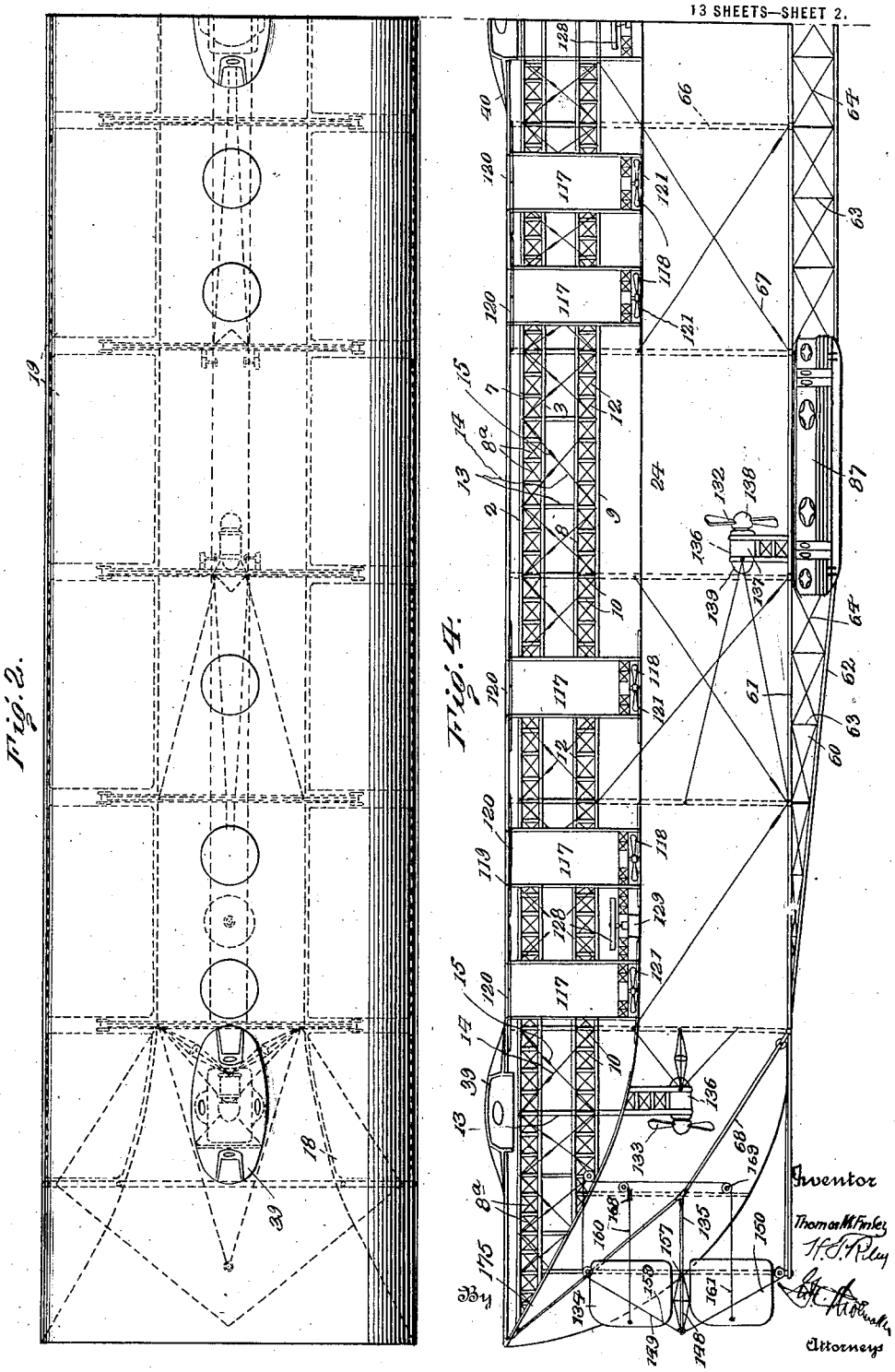

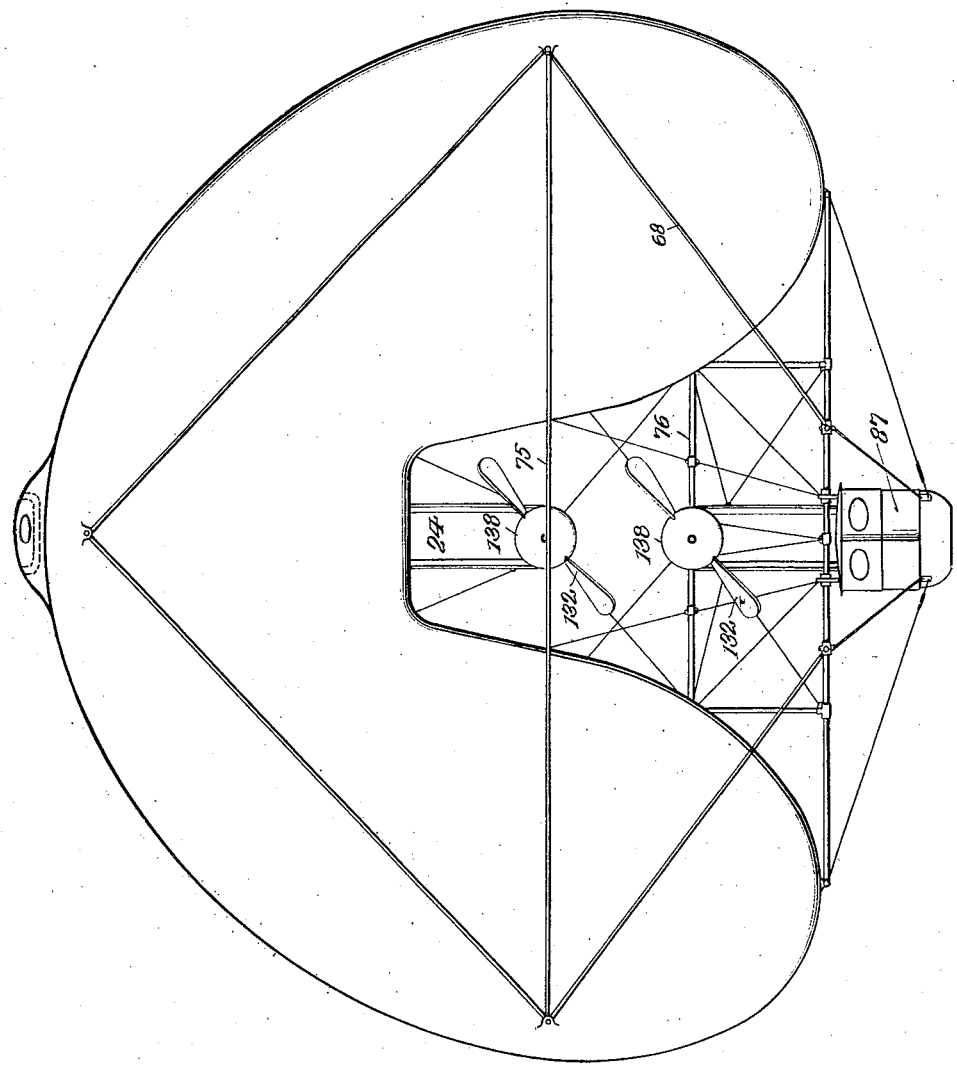

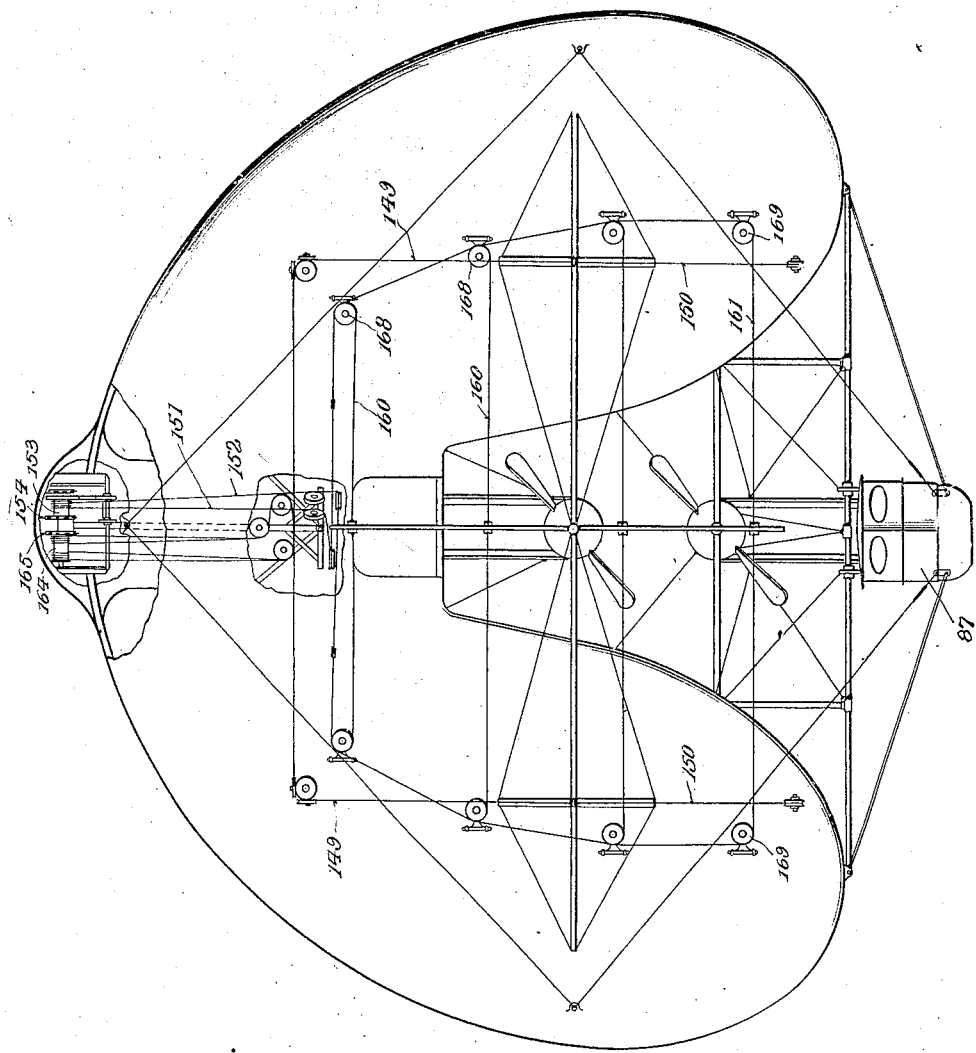

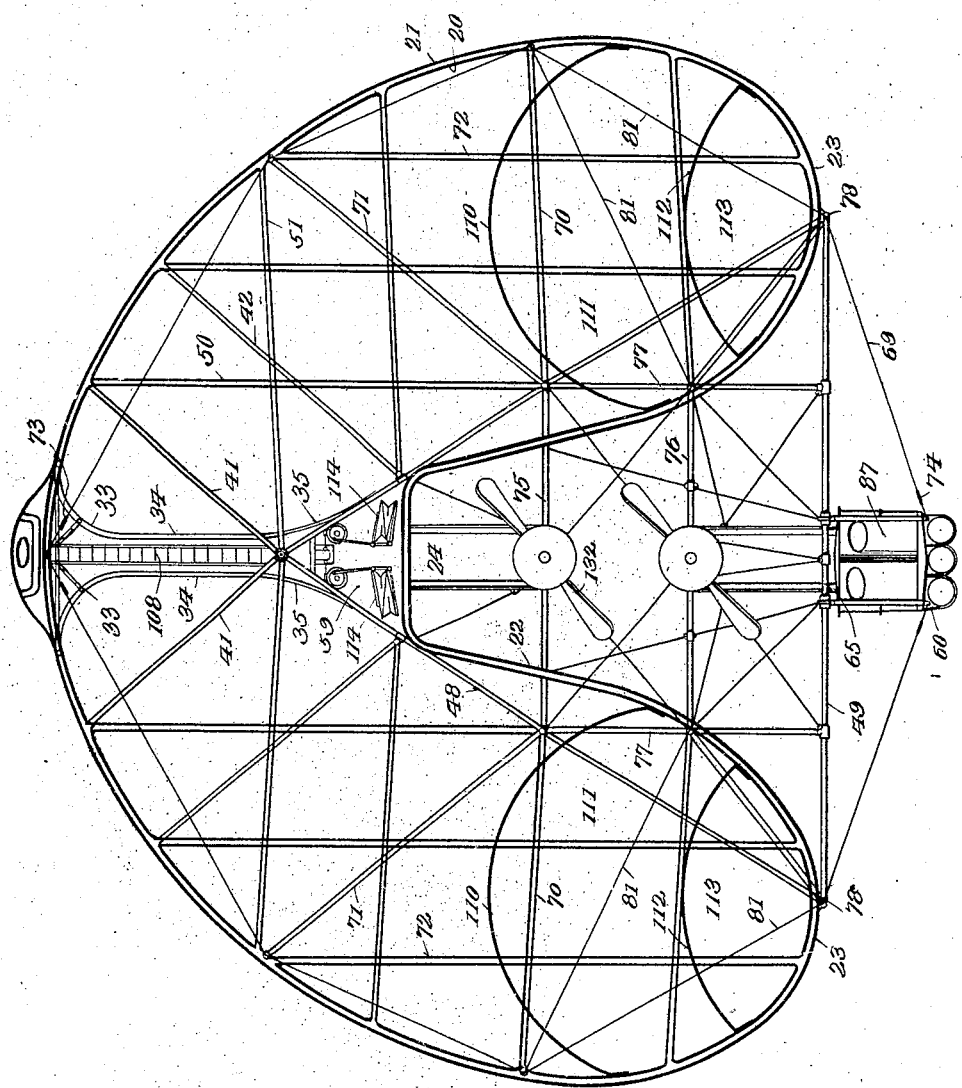

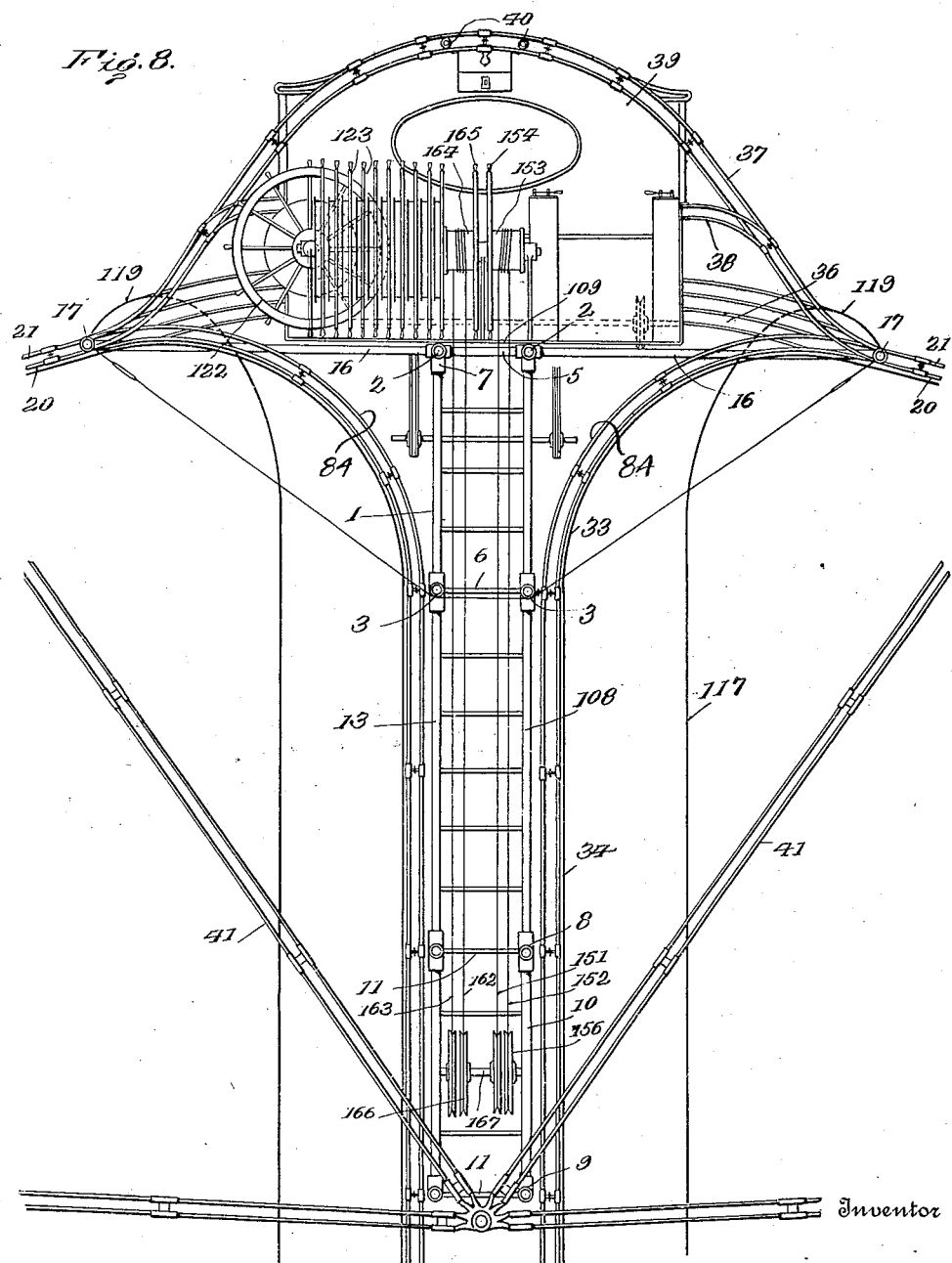

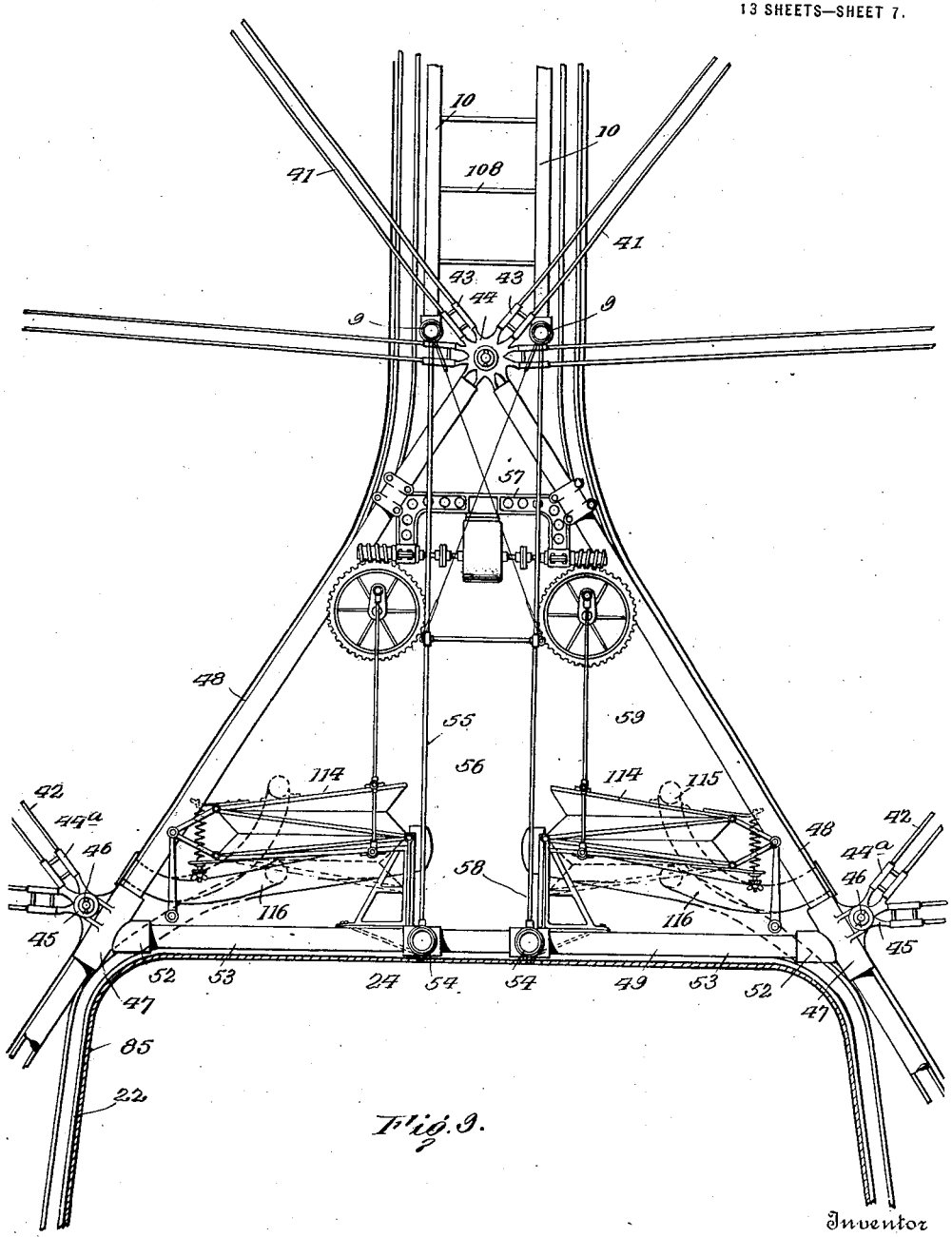

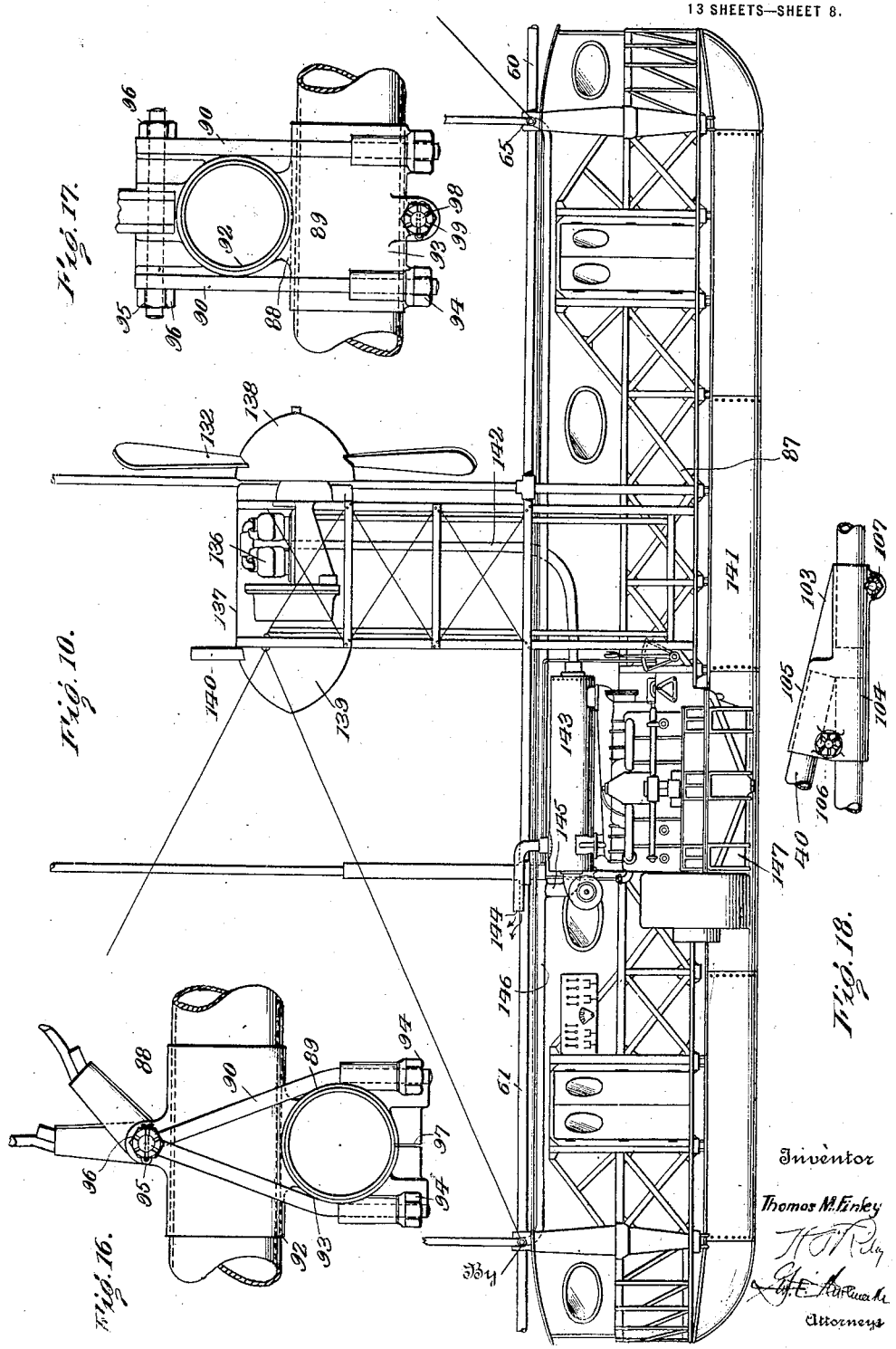

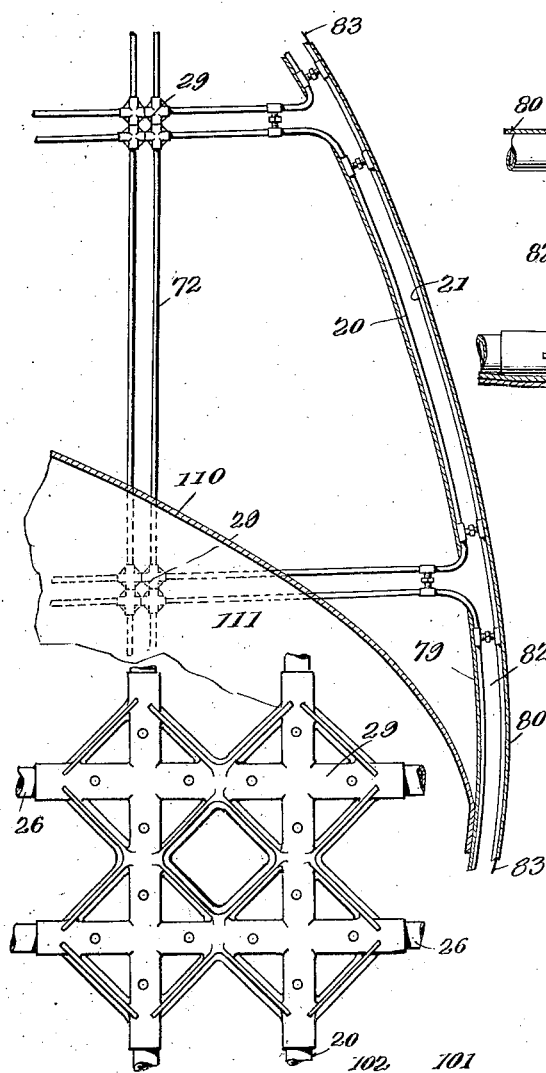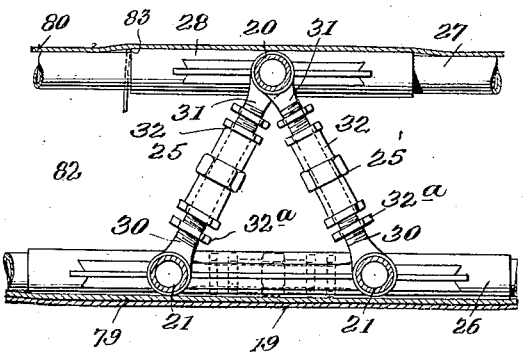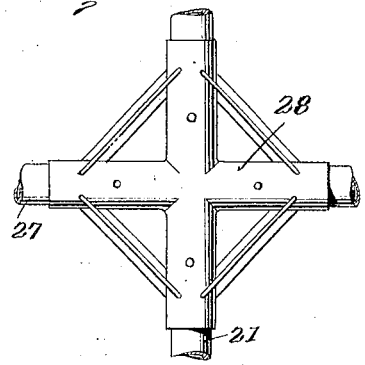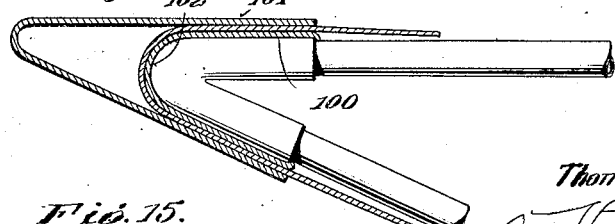

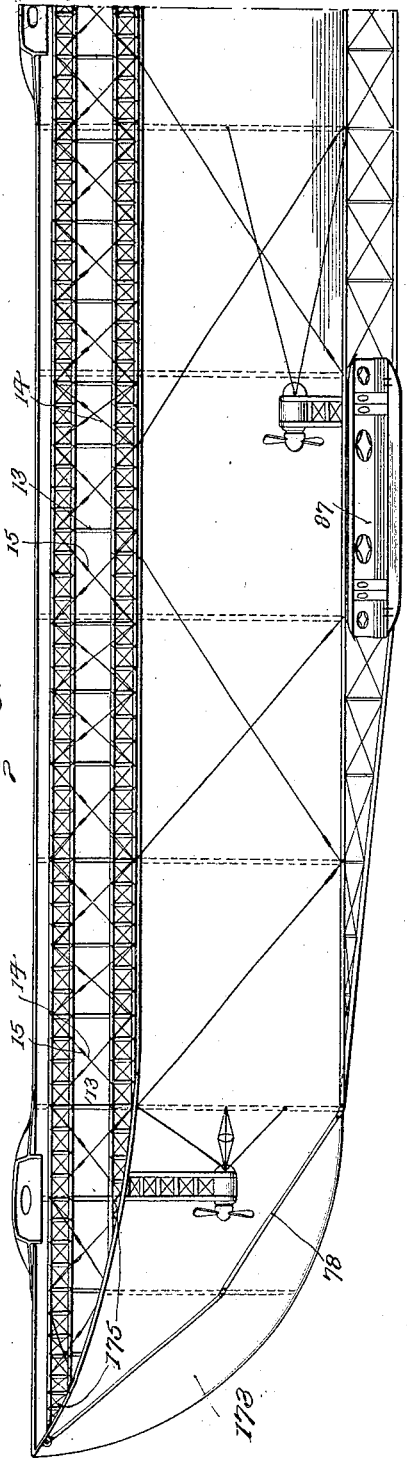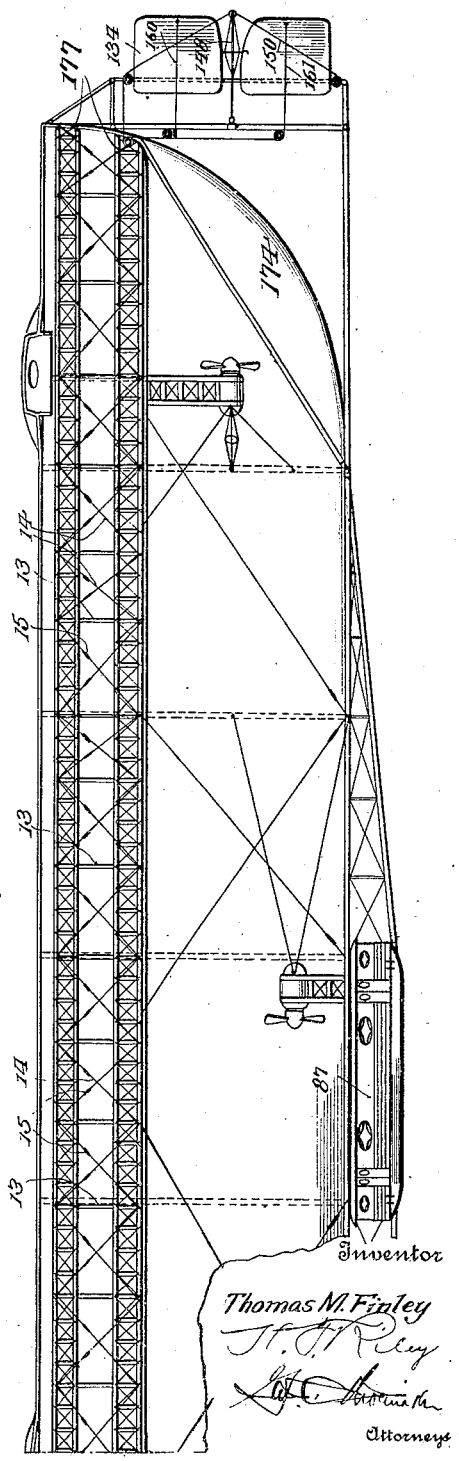

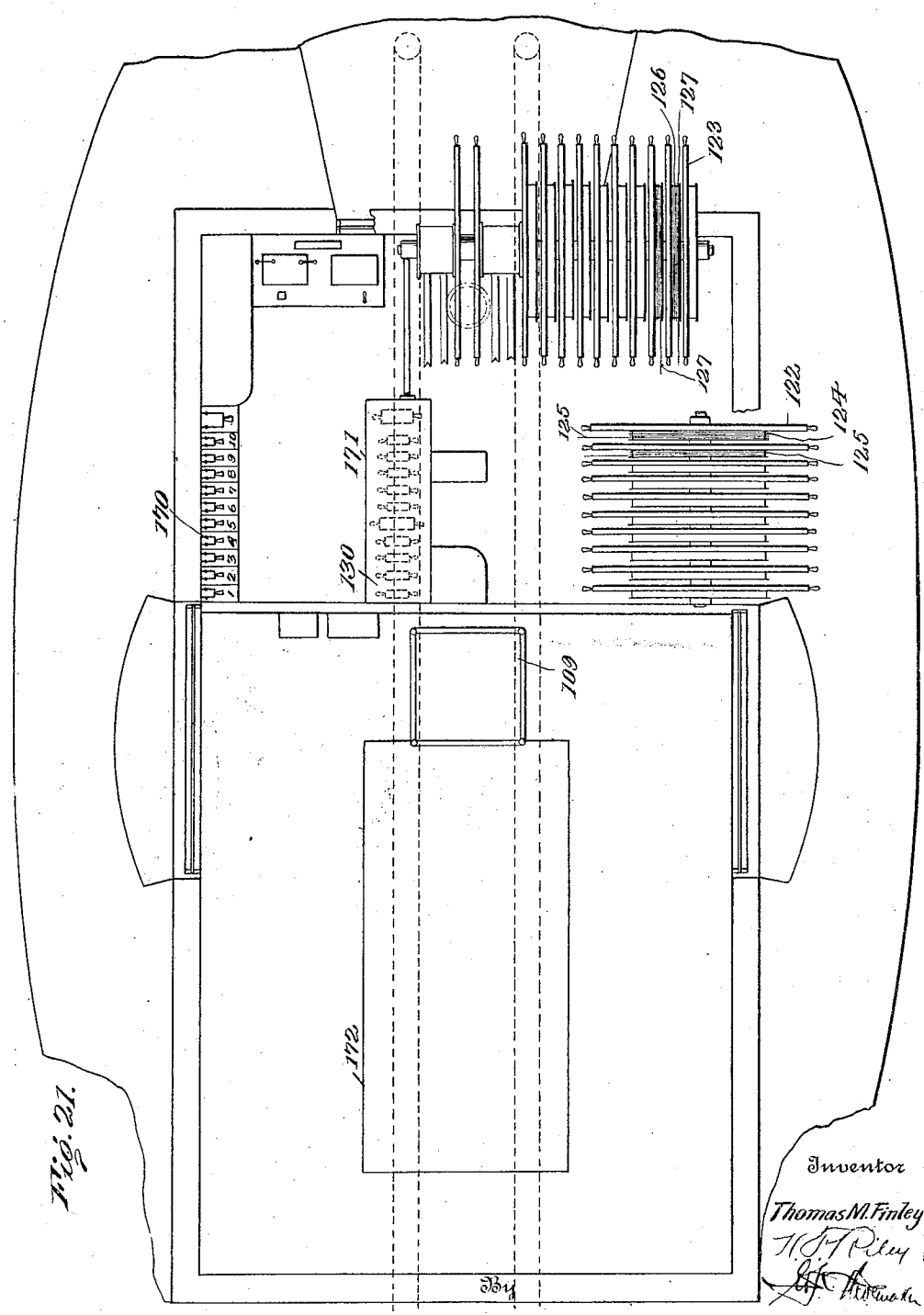

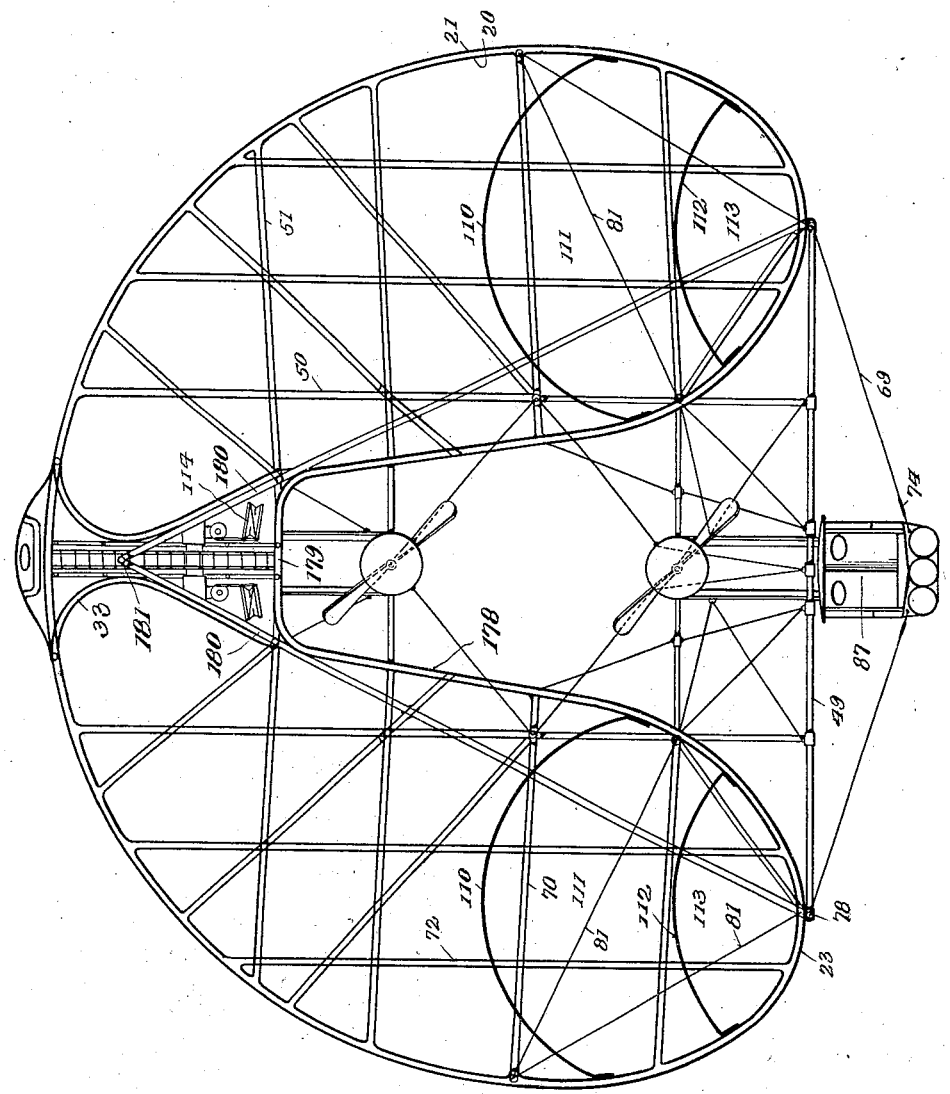

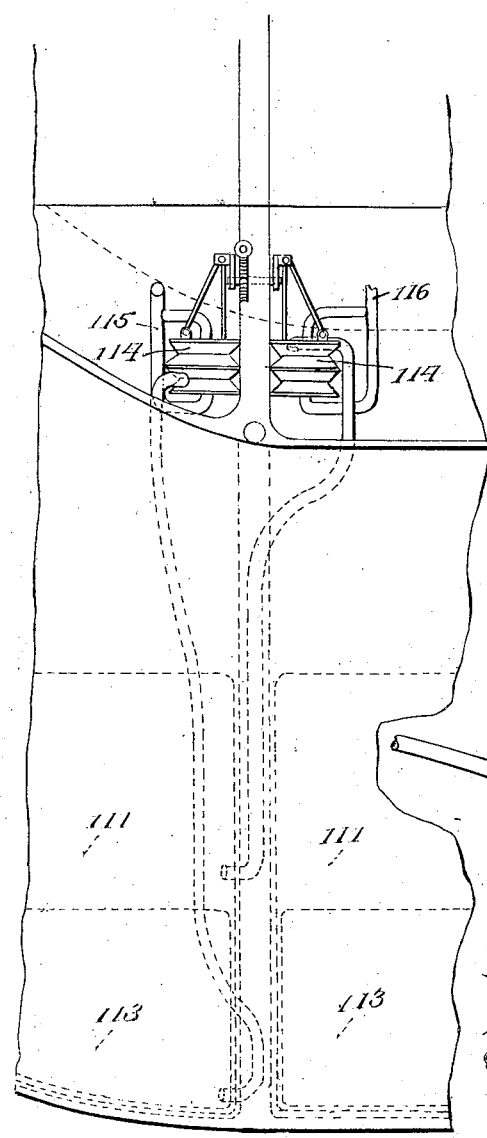
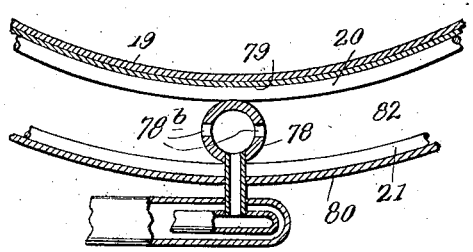
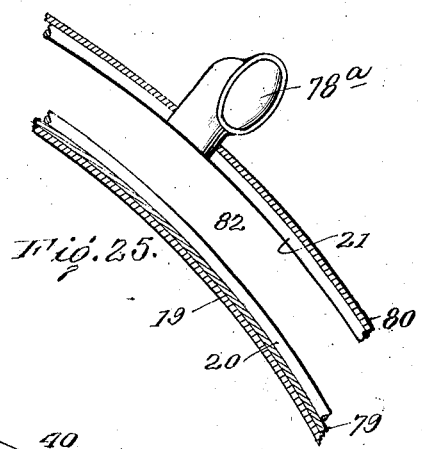
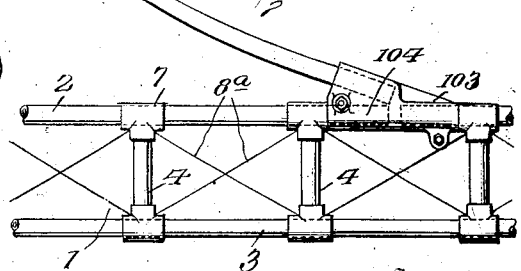

UNITED STATES PATENT OFFICE.

THOMAS M. FINLEY, OF ST. LOUIS, MISSOURI.

FLYING MACHINE.

1,426,369. Specification of Letters Patent. Patented Aug. 22, 1922.

Application filed July 20, 1918. Serial No. 245,885.

*To all whom it may concern:*

Be it known that I, THOMAS M. FINLEY, a citizen of the United States, residing at St. Louis, in the State of Missouri, have invented certain new and useful Improvements in Flying Machines, of which the following is a specification.

The invention relates to an aerocruiser.

The object of the present invention is to improve the construction of aircraft and to provide a practical, efficient and comparatively simple machine possessing the characteristics of a zeppelin, aeroplane, parachute and the non-rigid type and equipped with a supporting framework which will be in tension against both air displacement and gas displacement and capable of affording the requisite strength and stability.

A further object of the invention is to provide a machine of this character approximately crescent shape in cross section presenting substantially a cylindrical exterior at the top and sides and having a central lower longitudinal trough or passage with interiorly tapered flared ends and adapted to cause all of the air displaced by it to be drawn into the longitudinal trough or passage and pressed under the machine to prevent the formation of a front air pact and to produce a strong, dense current of air beneath the machine for supporting the same and for enabling the propelling and controlling means to operate with maximum efficiency.

It is also an object of the invention to transfer the pressure resulting from the air displacement of the machine from the top and sides to the bottom of the same not only for the purpose of providing a strong support for the machine and affording an increased lifting and carrying capacity, but also for the purpose of eliminating increased air pressure from the top and sides of the machine so that the machine at the top and sides will be subjected only to ordinary atmospheric pressure for the altitude at which the machine is travelling and preventing the crushing effect of the air and its retardation of the forward progress of the machine when the latter is driven through an air pact produced by the displaced air and which causes the machine to be subjected to a uniform air pressure throughout its entire exterior surface. The elimination of the pressure of the displaced air from the top and sides of the machine enables the framework thereof to be placed in tension instead of compression and also clearly facilitates the ascent of the machine and enables the same to operate with maximum effect as a parachute, and produces a strong pressure on the rear end to urge the machine forward.

The invention also has for its object to provide a machine of a heavier than air type in flight adapted to afford a sufficient gas lift to enable the machine to rise clear of obstructions and also to permit the desired amount of cargo and equipment to be carried and capable also of obviating the necessity of carrying ballast to be discharged in flight like the ordinary zeppelin to reach high altitudes and equipped with means for producing a circulation of heated air around the exterior of the gas containers to maintain the gas at its maximum efficiency and to prevent dangerous accumulation of gas which seeps through the gas containers, and also to maintain the exterior of the machine at a sufficient temperature to prevent accumulation of ice and snow thereon in high altitudes.

With the above and other objects in view the invention consists in the construction and novel combination and arrangement of parts hereinafter fully described, illustrated in the accompanying drawings, and pointed out in the claims hereto appended, it being understood that various changes in the form, proportion, size and minor details of construction, within the scope of the appended claims may be resorted to without departing from the spirit or sacrificing any of the advantages of the invention.

In the drawings:

Figure 1 is a plan view of the front half of an aerocruiser included in accordance with this invention;

Fig. 2 is a similar view of the rear half of the same;

Fig. 3 is a longitudinal sectional view of the front half of the aerocruiser;

Fig. 4 is a similar view of the rear half of the same;

Fig. 5 is a front elevation of the aerocruiser;

Fig. 6 is a rear elevation of the machine;

Fig. 7 is a transverse sectional view of the same;

Fig. 8 is an enlarged detail sectional view through one of the pilot houses and the upper portion of the frame;

Fig. 9 is a similar view illustrating the construction of the central portion of the framework;

Fig. 10 is an enlarged longitudinal sectional view through one of the cabins;

Fig. 11 is an enlarged detail transverse sectional view of a portion of the frame illustrating the arrangement of the inner skins and the outer skin or covering;

Fig. 12 is an enlarged detail sectional view of a portion of the outer framework;

Figs. 13 and 14 are detail views of the single and double crosses of the outer framework;

Fig. 15 is a detail sectional view illustrating the arrangement of the crown sheet and the crown cap for securing the outer skin or covering at the ends of the framework;

Figs. 16 and 17 are detail views of the cabin hanger;

Fig. 18 is a detail view of the tube coupling for the pilot housing construction;

Figs. 19 and 20 are longitudinal sectional views of the front and rear portion of an aerocruiser illustrating a modification of the invention;

Fig. 21 is an enlarged detail plan view of one of the pilot houses illustrating the arrangement of the equipment thereof; and Fig. 22 is a transverse sectional view illustrating the modification of the invention.

Fig. 23 is a diagrammatic view illustrating the arrangement of the pumping mechanism and the gas control.

Fig. 24 is a detail sectional view illustrating the construction of the hot air inlet of the body.

Fig. 25 is a detail sectional view illustrating the construction of the funnel or siphon outlets for the heated air.

Fig. 26 is a detail view of a portion of the frame work illustrating the arrangement of the longitudinal arched members of the pilot house.

In the accompanying drawings in which is illustrated the preferred embodiment of the invention, the framework of the aerocruiser comprises an upper longitudinally disposed compound truss 1 constituting the backbone of the framework and composed of upper and lower trusses arranged in parallelism. The upper truss is composed of upper and lower longitudinally disposed tubular truss members 2 and 3, vertical struts 4 and transversely disposed horizontal cross pieces 5 and 6. The framework is designed to be constructed of aluminum or other suitable material and the longitudinal vertical and transverse members of the upper truss are connected by suitable couplings 7. The upper truss is also provided with diagonal braces 8ª extending from the upper ends of the vertical struts to the lower ends of the same and crossing centrally of the spaces between the said struts. The lower truss or section of the compound truss is constructed similar to the upper section and is composed of upper and lower longitudinal truss members 8 and 9, vertical struts 10 and upper and lower horizontal cross pieces 11. The lower truss is also provided with crossed diagonal braces 12 and the upper and lower trusses or members of the compound truss are connected at intervals by vertical members 13 arranged at intervals and extending from the lower longitudinal tubes of the bottom truss to the upper longitudinal tubes of the upper truss and connected by couplings with each of the longitudinal truss tubes or members. The compound truss is also provided with crossed diagonal braces 14 extending from the upper to the lower ends of the vertical connecting members 13 and crossed centrally of the spaces between the same. These diagonal braces which are provided with adjusting devices 15 may consist of cables, tubes, rods or any other suitable form of bracing.

The compound truss is connected at the top of its upper truss with an outer frame work by laterally extending bracing members or arms 16 consisting of tubes and arranged horizontally and connected at their outer ends to longitudinal tubes 17 and the said tubes 17 which extend the entire length of the machine, are located at opposite sides at the top thereof and are connected at intervals with transversely disposed frames arranged at intervals and dividing the framework of the machine into transverse compartments for the reception of end and intermediate gas containers 18 or 19 which are arranged at opposite sides of the center of the machine and which extend from one end to the other thereof. The transverse frames consist of ribs and bracing elements or members, the ribs being composed of inner and outer frame tubes 20 and 21 conforming to the contour of the body of the machine and composed of outer curved side portions and an approximately inverted U-shaped lower central portion 22 which is connected at its lower terminals with the lower terminals of the side portions of the rib. The bottom connecting portions 23 of the ribs are approximately semi-circular and provide rounded portions at opposite sides of the body at the bottom thereof, the inverted U-shaped central portion of the ribs defining the contour of a central longitudinal trough 24. Each rib consists of a pair of inner frame tubes 20 and a single outer frame tube 21 which are connected by lock bolts 25 arranged in the form of a triangle and forming rigid bracing means for connecting and properly spacing the inner and outer frame tubes as clearly illustrated in Fig. 12 of the drawings. The inner and outer frame tubes are also connected with inner and outer longitudinal tubes 26 and 27 of the outer framework and they are connected with the said inner and outer tubes 26 and 27 by double and single crosses 28 and 29 preferably consisting of aluminum castings having tube receiving sockets arranged at right angles and reinforced by integral bracing webs or flanges as clearly shown in Figs. 13 and 14. The lock bolts are composed of right and left hand threaded sections 30 and 31 and a connecting sleeve 32 which has right and left interior screw threads to engage those of the bolt sections 30 and 31, the parts being locked in their adjustment by means of nuts 32 arranged on the bolt sections and engaging the ends of the sleeve. The sleeve has a central polygonal wrench receiving portion to enable it to be readily adjusted. The inverted U-shaped portion 22 of the rib consists of a horizontal transversely disposed top and downwardly diverging sides or legs and the ribs are continuous from the central inverted U-shaped portion to the top of the machine, extending outwardly from the terminals of the U-shaped portions and then upwardly and inwardly, as clearly illustrated in Fig. 7 of the drawings. The terminal portions of the ribs are extended downwardly and inwardly at opposite sides of the compound truss, the extensions forming upper curved portions 33 intermediate vertical parallel portions 34 and lower diverging portions 35 which terminate at opposite sides of the top of the inverted U-shaped portion being connected with the same by couplings or other suitable means. The extensions at the upper terminals of the side portions of the rib are tied to the compound truss and they unite the top of the rib with the top of the inverted U-shaped portion forming a rigid bracing and sustaining rib. The laterally extending arms or portions 16 of the compound truss are connected with the ribs by the longitudinal tubes 17 at the points where the ribs merge into the terminal extensions and the said ribs are also connected at the top of the body by curved connecting members 36, 37 and 38. The curved connecting members 36 conform to the curvature of the side portions of the ribs and occur at points between the pilot houses 39, while the curved connecting members 37 and 38 are arranged at the pilot houses and support the same, as clearly shown in Fig. 8 of the drawings. The pilot houses are arched both longitudinally and transversely. The curved connecting portions are preferably composed of inner and outer frame tubes arranged similar to the frame tubes of the ribs and the pilot houses are also supported by longitudinally disposed curved connecting members 40 which are connected at their terminals with the longitudinal frame tubes of the outer framework.

The outer frame tubes 21 are continuous, while the inner frame tubes 20 which are arranged in pairs are provided at intervals with extensions forming inclined and vertical connecting members or braces each comprising four separate frame tubes connected at intervals by locked bolts. The inner frame tubes are extended downwardly and inwardly at the upper portion at spaced points to form the inclined braces 41 and 42 arranged in substantial parallelism, as shown in Fig. 7 of the drawings. The top inclined braces 41 extend downwardly and are secured in sockets 43 of a coupling 44 located at the bottom of the compound truss which has the lower side or longitudinal truss members arranged at opposite sides of the lower terminals of the said inclined braces 41. The intermediate inclined braces 42 extend downwardly and inwardly and are secured in sockets 44ª of side couplings 45 located at opposite sides of the top of the trough and connected by pins or bolts 46 with couplings 47 arranged intermediate of the ends of the inclined sides 48 of a triangular bracing and supporting element composed of the said inclined sides and a horizontal connecting portion or member 49. The triangular bracing element is connected at its apex with the bottom of the compound truss by the coupling 44 and is connected at its base with the outer framework at the bottom of the wings or portions which are located at opposite sides of the trough or passage 24 and which are formed by the same. The inner frame tubes of the outer framework are extended at points below the upper ends of the inclined braces 41 and 42 to form vertical and horizontal braces 50 and 51 which form squares and coact with the inclined braces to provide a rigid structure. The side couplings 45 are provided with a plurality of sockets to receive the adjacent ends of the braces and the couplings 47 have inwardly extending horizontally disposed sockets 52 which receive and are secured to the ends of horizontal connecting and supporting tubes or members 53 which are located at the top of and extend across the longitudinal trough or passage. The ribs and the horizontal connecting tubes or members 53 are connected to spaced longitudinal tubes 54 located at the top of the trough in vertical alinement with the side tubes of the compound truss and connected with the latter by vertical side tubes 55 which define a longitudinal passage 56. The horizontal supporting tubes or members and the top of the inverted U-shaped portions of the ribs are adapted to support flooring 57 located at the passage 56 which is also preferably provided with low walls 58 designed to form a protection for persons in the passageway. The triangular space 59 formed by the upper portions of the sides 48 of the triangular bracing element and the horizontal connecting members 53 thereof is open and may be utilized for containing mechanism, freight, etc., and flooring or platforms may be provided as required.

The base of the triangular supporting element is connected with a lower longitudinal bridgework 60 composed of top longitudinal tie or connecting members 61, lower longitudinal truss members 62 and vertical struts 63. The truss members 62 are secured at their ends to the longitudinal connecting members and the bridgework is braced by a diagonal bracing 64 located between the vertical struts and designed to be provided with adjusting devices similar to the diagonal bracing heretofore described. The tie and truss members are arranged in pairs and are connected by upper and lower horizontal cross pieces 65. The bridgework is connected with the compound truss by vertical members 66 and inclined diagonally arranged braces 67 provided with adjusting devices and located between the vertical connecting tubes or members. The framework is also braced by longitudinal cables 68 secured at their terminals to the outer framework at the ends of the body and converging inwardly therefrom to the ends of the longitudinal tie or connecting members or tubes 78 of the framework and passing through the same. These cables which are provided with adjusting means are adapted to place the entire framework under tension and they are protected between their ends by being passed through the lower tubular members 78 of the framework.

The framework is also tensioned by inner transversely disposed cables 69 located at intervals and occuring at the transverse frames at points between the gas containers and extending from the bottom of the bridgework at the lower truss members thereof to the lower angles of the triangular bracing element and then upward to the outer terminals of the intermediate approximately horizontal braces 70 at an angle to the lowermost stretches of the said tensioning cable. The tensioning cable extends upwardly from the outer terminals of the bracing members 70 to the connected terminals of the upper horizontal bracing members 51 and the adjacent inclined and vertical bracing members 71 and 72 and the said tensioning cable is then extended upwardly to the center of the top of the framework adjusting devices 73 and 74 being provided at the top and bottom of the machine for tensioning the inner cable 69. The inner cable 69 is adapted to place the transverse framework under tension. The inclined, vertical and horizontal bracing members of the transverse framework are connected with an inner rectangular bracing element composed of a top horizontal tube 75, an intermediate horizontal tube 76, vertical side tubes 77 and the horizontal connection portion or member 49 which extends across the top of the bridgework and projects laterally therefrom and consists of an inner top cross piece of the bridgework and laterally extending air tubes. Those portions of the connecting member 49 which extend from the sides of the bridgework to the longitudinal tubes constitute air tubes and are connected at their outer ends with the longitudinal tubes 78 which extend lengthwise of the machine from one end of the same to the other end thereof and are provided at intervals with perforations 78$^b$ adapted to discharge heated air to the intervening space between an inner skin 79 and an outer skin or covering 80 arranged at the outer framework and spaced apart by the inner and outer frame tubes. The top horizontal tube 75 extends across the central portion of the machine at a point below the top of the longitudinal trough or passage and the intermediate horizontal tube 76 connects the vertical side tubes 77 midway between the bridgework and the top horizontal tube. The rectangular bracing element is connected at its upper angles or corners to the inclined sides of the triangular bracing element at points at or near the centers of the same and the upper inclined bracing members 41 which form a substantially V-shaped bracing element are connected at their lower ends to the apex of the triangular bracing and supporting element and at their upper ends with the rib. The rib connects the upper ends of the inclined bracing members 41 and forms with the same an inverted triangular bracing element opposed to the lower triangular bracing and supporting element and adapted to coact therewith to provide a strong connection between the upper and upper portions of the outer framework of the machine. The other inclined bracing members 42 and 71 connect the side portions of the rib with the triangular supporting and bracing member and terminate respectively at the top of the arched portion of the rib and at the points where the upper angles of the rectangular bracing element are connected with the inclined sides of the triangular bracing element. The framework may also be braced at various points by cables 81. The bracing elements form truss like structures and are adapted to resist the strains in all directions and provide a firm structure which is in tension at all times.

The outer skin or covering 80 which is arranged exteriorly of the outer framework is designed to have a cloud gray exterior color and to have a black inner surface and the walls of the longitudinal passage or channel are constructed of sheet metal. The inner skin which is arranged at the inner side of the outer framework, as clearly illustrated in Fig. 11 of the drawings is designed to be black to darken the intervening space between the inner and outer skins as the diffusion of the hydrogen gas seeping from the gas containers and entering the intervening space between the inner and outer skins and the mixing of the gas with air occurs less rapidly in the dark than in the light and with the aid of the circulation of heated air through the intervening space between the inner and outer skins, all liability of dangerous mixtures of gas and air collecting in the machine is eliminated. The heated air passes through the laterally extending air tubes into the longitudinal disposed air tubes 78 and discharging into the intervening space 82 at the bottom of the body at opposite sides thereof passes upward at both the inner and outer sides of the lower side portions or wings of the body to the top of the same carrying off any gas which may have leaked into such space 82 and at the same time maintaining the gas within the containers at the desired temperature to secure the maximum efficiency and also maintaining the outer skin or covering at a sufficiently high temperature to prevent accumulation of snow and ice when the machine is in high altitudes or is subjected to cold from other causes.

The machine is provided at intervals with outer tensioning cables 83 extending around the body of the machine in the intervening space between the inner and outer skins and lying against the longitudinal tubes 27 of the outer framework as clearly indicated in Fig. 11 of the drawings. These cables which are provided with tensioning devices extend across the body of the machine at the bottom thereof adjacent to the bottom of the bridgework and there maintain the framework in tension and subject the gas containers to a lift of the intervals similar to machines of the non-rigid type so that the present machine possesses the advantages of machines of both the non-rigid type and rigid type, in addition to its ability to plane and act as a parachute.

The inner skin against which the gas containers bear extends entirely around the approximately oval spaces formed by the ribs at each side of the machine and the outer covering which is canvas or other suitable fabric at the top and sides of the body is provided with extensions 84 located at the extensions of the rib and spaced from the inner skin to cooperate therewith to form a continuous intervening space between the outer and inner skins at the upper inner portion of the gas containers. The body of the machine is provided at the sides and top of the trough with a lining 85 which also cooperates with the inner skin to provide the intervening air space at opposite sides of the trough so that the heated air introduced into the intervening space 82 at the bottoms of the wings will be permitted a free passage upward at the inner and outer sides of the gas containers through the ability of the heated air to ascend. The air circulating through the intervening space between the inner and outer skins is discharged at the upper portion of the body and it may be sucked out by suitable funnels 28ª or pumped out or otherwise discharged and the circulation due to the introduction of the heated air will facilitate the discharge of the air at the outlets 28ª for the same.

The machine is equipped with cabins 87 secured in the bridgework between the upper and lower members of the truss of the same and hung from the framework of the machine by cabin hangers (see Figs. 16 and 17) comprising an aluminum casting 88 having a base portion 89 and provided with hanger rods 90 connecting the upper and lower portions of the casting and enabling the weight of the cabin to be sustained by the tensile strength of the hanger rods. The casting is provided with sleeves 92 and 93 arranged at right angles to each other and adapted to receive longitudinal and transverse tubes. The hanger rods have lower parallel portions which pass through the base portion of the casting and are threaded for the reception of castle head nuts 94 locked by cotter pins. The upper portions of the hanger rods converge and are provided with eyes through which passes a frame bolt 95 provided at its ends with castle head nuts 96 and cotter pins. The casting is split at the bottom at 97, the split portions being connected by a clamping bolt 98 equipped with castle head nuts 99 and cotter pins. The clamping bolt is adapted to clamp the casting firmly around the tubing and the hanger rods reinforce the aluminum castings and prevent any liability of breakage at the connection between the angularly related sleeves.

The outer skin or covering is secured at the ends of the machine between an inner crown cap 100 and an outer crown sheet 101 and is securely held between the same so that there is no liability of air entering beneath the outer skin or covering at the ends of the machine. The crown sheet and the crown cap are approximately V-shaped in cross section and they consist of inner and outer sides or wings and an outer connecting portion or bend 102, the connecting portion or bend 102 of the crown cap forming a seat for the canvas, as clearly shown in Fig. 15 of the drawings. The crown cap forms a metallic marginal binding for the ends of the machine at the interiorly tapered portions.

The longitudinal arch bars of the pilot houses are connected at their terminals with the adjacent longitudinal tubes of the framework by couplings 103 consisting of a longitudinal sleeve 104 and an angularly disposed socket 105 formed integrally with the sleeve. The sleeve 104 is adapted to receive the terminal portions of the sections or members of a longitudinal tube as illustrated in Fig. 18 of the drawings and the angularly disposed socket is arranged for the reception of the terminal of the longitudinal arched connecting member of the pilot house construction. The coupling is centrally split at one end and at the bottom of the other end to afford resiliency for lateral compression to clamp the coupled tubes and the split portions are connected by clamping bolts 106 and 107 having castle head nuts and cotter pins for securing the nuts in their adjustment.

Access is had to the pilot house by means of a ladder 108 extending from the longitudinal passageway through the double compound truss to a man-hole 109 in the floor of the pilot house. The longitudinal passage which is located between the roof or top of the trough and the bottom of the double compound truss may be arranged at any desired point centrally of the upper portion of the body and the size of the longitudinal trough or passage and the spread of the wings may be varied to vary the depression of the displaced gas and the consequent lift and carrying capacity of the machine.

The lift of the machine and the operation of the same as an aeroplane in its forward flight may also be varied by varying the interior taper of the front terminal portion of the body. It will be noted that this interior taper not only eliminates external pressure on the top and sides of the body but it effects a material saving in gas space as the interiorly tapered end will afford a larger gas space and will hold a greater volume of gas than the exteriorly tapered conical front end of machines of other types, besides presenting an inclined surface which in conjunction with the lower surface of the machine body is adapted to add a great buoyancy to the machine through the depression of the displaced air. By varying the depth of the machine through the upper central portion of the body above the trough and the inclination of the interior taper the power of the lift and the action on the front of the machine may be controlled. Also by varying the size and configuration of the longitudinal passage or trough, the action of the body as an aeroplane and also as a parachute may be varied to increase the effect of these characteristics of the machine.

The gas containers which are located in longitudinal sets or series at opposite sides of the double compound truss and which conform to the configuration of the ribs and the outer framework are provided at the depending side portions or wings of the body with longitudinal partitions or diaphragms 110 constituted of flexible material and extending across the wings at points above the bottom thereof and being of sufficient area to lie against the bottom of the air container when air chambers 111 formed by the flexible partitions or diaphragms 110 are deflated. The gas containers are also provided at the lower portions of the wings with flexible longitudinal partitions or diaphragms 112 extending across the lower portions of the wings and being of sufficient area to lie against the bottom of the gas containers when compression chambers 113 formed by the said partitions 112 are deflated. The partitions 110 and 112 are adapted, when the chambers 111 and 113 are inflated, to expand and form curved upper walls for the said compartments or chambers 111 and 113. The hydrogen gas contained within the gas containers for rendering the flying machine buoyant in the air is adapted to be drawn out or excluded to a greater or less extent to suit requirements from the gas containers and be compressed into the chambers 113 which are hydrogen gas compression chambers and are adapted to contain the compressed hydrogen gas in a form heavier than air. The chambers 111 which are adapted to receive air are inflated simultaneously with the withdrawing of the hydrogen gas from the gas containers and the compression of the withdrawn gas into the gas compression chambers 113 and the said chambers 111 and 113 are connected with pumps 114 by flexible tubes 115 and 116 and the pumps when in operation are adapted to exhaust the hydrogen gas from the gas containers and force the same in a compressed state into the gas compression chambers 113 and simultaneously force compressed air into the air chambers 111. The inflated air chambers and the gas compression chambers are adapted to occupy the space previously occupied by the volume of gas exhausted from the gas containers so that the cubic contents of the containers will be substantially the same at all times. The pumps perform the triple function of withdrawing the gas and converting the withdrawn gas into ballast and adding additional ballast in the form of air introduced into the air chambers 111. This construction enables ballast to be supplied to the machine as required, and will so enable the ballast to be removed from the machine by permitting the compressed gas to return to the gas containers. It will be noted that through this operation there is no loss of the gas or of ballast and thereby compressing the hydrogen gas from the gas containers than excessive of buoyancy or lift of the machine may be removed after the same has attained the desired altitude and also after the machine has risen from the surface of the ground and begins its flight. It is only necessary that the machine be able to lift itself a short distance above the ground sufficient to clear obstructions, for as soon as the flight of the machine begins the aeroplane action due to the interiorly taper of the front end of the body and the operation of the spaced depending wings and the intervening longitudinal trough or passage for the displaced air will increase the lift and carrying capacity of the machine so that it is necessary after the machine is in flight to reduce the buoyancy or gas displacement to prevent the machine from rising higher than is desired. As there is no loss of gas and as the gas may be returned to the gas containers after being compressed within the chambers 113, the machine may ascend to any desired altitude and may then descend without losing the gas so as to enable it through a reuse of the gas to ascend and descend as often as desired without necessitating a return to its base and without requiring a new supply of hydrogen gas, the only loss being that which occurs through leakage or seepage of the gas through the material of which the gas containers are constituted.

By controlling the gas displacement and the amount of gas within the gas containers, the machine is adapted to be held at any desired altitude of flight irrespective of the amount of load or ballast which when in the nature of bombs may be dropped or discharged without causing the machine to leave such predetermined altitude and without necessitating a discharge of gas into the atmosphere and a consequent loss of such gas to compensate for a reduced load or cargo. The mechanism for pumping air and gas into the chambers 111 and 113 and for permitting the gas to return to the gas containers and the air to be withdrawn from the chambers 111 is designed to operate both manually and automatically for the purpose of manual control and also for automatically maintaining the machine at a predetermined altitude and for preventing excessive gas pressure within the gas containers when the machine is ascending in high altitudes so that there will be no liability of the gas being forced through the pores of the fabric and producing leaks which cannot be repaired and which would result in a total escape of the gas in course of time. This mechanism for the control of the pumping mechanism forms the subject matter of a companion co-pending application and is not claimed herein.

The machine may, as illustrated in Figs. 1 to 4, inclusive, be equipped with vertical air shafts 117 and vertical screw lift propellers 118 operating at the lower ends of the vertical air shafts, but these may be omitted as illustrated in Figs. 19 and 20 of the drawings. The vertical air shafts which may be of any desired number and be arranged at any suitable intervals extend from the top wall of the longitudinal trough or air passage through the upper central portion of the body to the top thereof, the upper ends 119 of the air shafts being preferably flared. The vertical air shafts are of sufficiently greater diameter than the vertical screw lift propellers to enable the latter to operate effectively and ample air space is provided at the lower ends of the vertical shafts to permit the ends of the blades of the screw propellers to operate effectively on the air and produce a strong down draft. These vertical air shafts and screw propellers 118 are designed to enable the machine to rise vertically or substantially vertically from the ground and also to hover in the air at any desired altitude and to control the descent of the machine. When, however, the vertical air shafts and the screw lifting propellers are not employed as illustrated in Figs. 19 and 20, the weight of the engines of the screw lift propellers and the vertical shafts and other equipment incident to the employment of these features, is eliminated and greater gas space is afforded so that the machine will possess sufficient buoyancy and may be controlled by the air and gas displacement of the gas containers, the air chambers and the compression chambers. The vertical shafts are provided at their ends with upper and lower sliding doors 120 and 121 which are adapted to be opened and closed to expose the air shafts and to close either or both ends of the same partly or wholly as desired. By constricting the vertical air shafts, the action of the same may be varied and by opening the lower door and closing the upper doors the air shafts are adapted to act as air pockets and by controlling the escape of air through the passages or pockets in the descent of the machine, greater control of the latter will be afforded. The air shafts are preferably of the same diameter from their lower ends to the upper flared portions at the top of the body. The doors at the top and bottom of the air shafts are controlled by sets of wheels 122 and 123 located within the pilot house at the front and one side of the same. The wheels 122 which are located at the side of the pilot house are provided with drums 124 which receive cables 125 extending to the top doors and the wheels 123 which are arranged at the front of the pilot house are provided with drums 126 having cables 127 extending to the bottom doors. In practice, the doors will be moved in one direction by the cables 125 and in the opposite direction by springs which are adapted to maintain the cables under tension and taut at all times. The particular construction of the doors and the manner of mounting and controlling the same forms the subject matter of a separate co-pending application and no claim for such structure is made in the present application.

In order to enable the machine to rise and descend in a horizontal position and to maintain the machine on an even keel or in a horizontal position while hovering, it is provided with gyroscopes 128 preferably located at the front and rear of the machine as indicated in Figs. 3 and 4 of the drawings, but any desired number of gyroscopes may of course be employed and they are designed to be operated by engines 129 controlled by electric switches 130 located in the pilot house, as indicated in Fig. 21 of the drawings.

The machine is equipped with a front tractor propeller 131, a plurality of main tractor propellers 132 and a rear pusher propeller 133. The front tractor propeller 131 which is hung from the upper portion of the framework of the machine operates in the flared or semi-funnel shaped front end of the longitudinal passage or trough and it is adapted to draw in the air displaced by the machine and it is also adapted to rarify the air and create a partial vacuum in advance of the machine so that the air pact which is present in machines having exteriorly tapered front portions is not only eliminated but an atmosphere of reduced pressure is produced in advance of the machine which facilitates the forward progress of the machine at a high rate of speed. The air displaced by the machine instead of choking or retarding the forward progress of the machine serves as a sustaining force for the same and operates entirely beneath the machine instead of completely enveloping the same as is the case with machines having the exteriorly tapered front portion. The air is driven through the longitudinal trough or passage by the main propellers 132 which are located above the cabins, and while only two of the propellers are shown, the number of the same may of course be varied to develop the desired power. The main propellers are located below the horizontal plane of the shafts of the front and rear propellers 131 and 132 and the rear pusher propeller operates in the tapered rear terminal portion of the trough or passage and is located in advance of rudder planes 134 and stabilizing plane 135. A strong pressure or back wash of the air is produced at the rear end of the machine and this pressure tends to urge the machine forward. Also the location of the rear pusher propeller in advance of the stabilizing and rudder planes insures a strong, steady current of air in which the said planes operate and which insures a maximum efficiency of the controlling mechanism for steering the machine.

Each of the tractor propellers is designed to be operated by a large horse power engine 136 but the size of the engines and the propellers may of course be varied to suit the size of the machine in which they are to be installed. The engine 136 is arranged within a cylindrical casing or housing 137 and is located immediately in the rear of the propeller which is provided with a semi-spherical helmet 138 located within the scroll of the propeller and adapted to reduce the air resistance and increase the power of the propeller. The engine is also equipped with a semi-spherical tank 139 located in rear of the cylindrical casing or housing as clearly shown in Fig. 10 of the drawings. The front helmet 138 and the rear tank 139 have a diameter substantially that of the cylindrical casing or housing. The engine is equipped with a vertical adjustable radiator 140 which is adapted to be raised and lowered to enable the desired amount of heat radiation to be affected at the altitude at which the machine may be flying, a less amount of radiation being necessary as the machine ascends and the temperature of the atmosphere decreases. The engine is designed to be connected with gasolene tanks 141 located beneath the cabin and arranged as clearly shown in Fig. 10 of the drawings. In practice the engine will be supplied with gasolene by a supply system which will afford a continuous supply of gasolene to the engine from a receptacle containing preferably about one gallon of gasolene and by this arrangement the gasolene tanks 141 are not only located at a point remote from the engine but they are disposed beneath the cabin at the bottom of the machine. This, with the weight of the engines and the other equipment, will prevent any overhead drag and will place the center of gravity of the load below the body of the machine so that there will be no liability of any rolling action of the machine in flight.

The main tractor engines 136 are supported in an elevated position with respect to the cabins and are adapted to be raised and lowered to carry them into and out of operative position and to bring them within the cabin either for repair or to permit the engine to rest out of the air passing through the trough or passage when not required for the operation of the machine. The front tractor propeller 131 is adapted to be raised and lowered into and out of operative position and may be drawn into the upper portion of the body for repair or other purpose. The rear pusher propeller 133 is mounted in a manner similar to the front tractor propeller with the exception that the propeller is located in rear of the engine instead of in advance of the same. The engines are suitably braced by adjustable cables and the engines of the main tractor propellers are connected by flexible exhaust tubes 142 with regenerators or heaters 143 adapted to supply fresh heated air to the intervening space between the inner and outer skins of the body. The flexible exhaust tube 142 is adapted to permit the raising and lowering of the engine and propeller without affecting the connection between the engine and the regenerator. The exhaust gases from the engines are thus utilized and taken care of. No claim is made in the present application to the particular construction of the engines and the means for adjustably mounting the same as this forms the subject matter of a separate copending application.

The exhaust gases passing through the regenerator or heater are discharged from an outlet 144 into the atmosphere. The regenerator or heater operates as a muffler or silencer for eliminating the noise from the internal combustion engine. The regenerator or heater, which is shown in detail in a companion application and which is described and claimed therein, is provided with a shoulder air outlet 145 which is connected with a hot air pipe or conduit 146 located within and extending longitudinally of the cabin and arranged at the top of the same. This hot air pipe or conduit is connected at its terminals with the transversely disposed laterally extending hot air thermos tubes which communicate at their outer ends with the lower longitudinal tubes 78 that have perforations 78$^b$ and supply the heated air to the intervening space between the outer skin or covering and the inner skin. The laterally extending tubes which are utilized for connecting the hot air pipe or conduit with the longitudinal tube 78 are termed thermos tubes for the reason that they are designed to be equipped with a vacuum space for preventing the heated air, which passes through the thermos tubes, from being reduced in temperature by the atmosphere to which the thermos tubes are exposed. This will prevent loss of heat and reduction in the temperature of the heated air in passing from the regenerator or heater to the longitudinal tubes of the body of the machine. The heated air ascends at the inner and outer sides of the wings and escapes through the top longitudinal tubes 17 which are provided with outlet funnels for siphoning the air from the intervening spaces between the outer skin or covering and the inner skin.

The cabin is equipped with a generator 147 for supplying electric energy throughout the machine for operating the self starters of the motors, the blower of the regenerator or heater, for supplying current to the lights and for operating motors for raising and lowering the tractor propellers into and out of operative positions and for various other purposes.

The controlling mechanism for steering and maneuvering the machine may be located substantially within the rear inwardly tapered terminal portion of the longitudinal passage or trough as illustrated in Figure 4 of the drawings, or it may be located exteriorly of the body beyond the rear end of the same, as shown in Figure 20 of the drawings. The stabilizing plane 135 which is horizontally disposed, is provided with rear hinge sections or elevating planes 148 arranged to swing upwardly and downwardly and connected with branches 149 and 150 of cables 151 and 152 extending to and reversely wound around the drum 153 of a stabilizing plane wheel 154 and adapted to be wound or unwound from the said drum 153 for winding one of the cables and simultaneously unwinding the other to swing the hinged sections or elevating planes of the stabilizing plane upwardly or downwardly according to the direction in which the controlling wheel 154 is rotated. The branches 149 and 150 extend upwardly and downwardly from the elevating planes 148 and they are arranged on guide pulleys 155 and the cables 151 and 152 extend along the body to guide pulleys or wheels 156 which are located directly below the stabilizing plane wheel, as clearly shown in Figure 8 of the drawings. The elevating planes are mounted on a horizontal pivot 157 and are located at opposite sides of the rudder planes 134 which are arranged above and below the elevating planes on a vertical pivot 158. The adjacent ends of the rudder planes are cut away at 159 to clear the elevating planes so that a free adjustment of the planes without interfering with one another is afforded. The vertical rudder planes are connected with branches 160 and 161 of cables 162 and 163 which are reversely wound around a drum 164 of a rudder wheel 165 located in the pilot house adjacent the stabilizing plane wheel. The cables 162 and 163 extend downwardly from the rudder wheel 165 to guide wheels 166 which are located below the rudder wheel 165 and which are preferably mounted on a shaft 167 at one side of the guide wheels 156. The guide wheels 156 and 166 are located at the opposite ends of the shaft 167 but they may be mounted in any other desired manner and the cables may extend in any convenient direction. The branches 160 and 161 of the upper and lower rudder planes are suitably guided by wheels 168 and 169 and when the rudder wheel is rotated the rudder planes will be swung to the right or left according to the direction of the movement of the rudder wheel and the cables will be maintained under proper tension at all times. The elevating plane wheel 154 and the rudder wheel 165 are preferably arranged at the center of the front of the pilot house, as illustrated in Figure 21 of the drawings, in which is illustrated a convenient arrangement of the controlling mechanism of the machine. The wheels for opening and closing the top doors of the vertical air shafts are located at the right hand side of the pilot house, while the wheels for controlling the bottom doors of the air shaft are located in front of the said walls at the right hand side of the stabilizing plane wheel. The electric switches 170 for controlling the downdraft propellers may be conveniently located at the left hand side of the pilot house and the electric switches 130 for controlling the motors of the gyroscopes and the electric switches 171 for controlling the motors of the forward draft propellers are shown at the center of the front portion of the pilot house between the electric switches 170 and the wheels 122 in spaced relation with the same. A mount 172 for air craft guns, is shown at the rear portion of the pilot house, but it will be clear that any other convenient arrangement of the controlling mechanism and the other equipment of the pilot house may of course be employed.

In Figures 19 and 20 of the drawings, is illustrated a slight modification of the invention, in which the front interiorly tapered end 173 of the longitudinal trough or passage has a longer taper than the front end of the body shown in Figure 4, and the rear end 174 is rounded at the outer portion of the taper. The ends 175 of the compound truss of the form of the invention shown in Figure 19 has a taper corresponding with the taper of the front portion of the body and the rear end 177 of this truss which is shown in Figure 20 is considerably less tapered, and conforms to the contour of the rounded portion of the tapered rear end of the body. The upper compound truss or backbone of the frame-work may, of course, be varied to correspond with the contour of the body and to provide the desired support for the tapered end portions of the same.

In Figure 22 is illustrated a modification of the invention in which the inverted approximately U-shaped trough defining portion 178ª of the rib is carried upward to the bottom of the upper compound truss 179 and the sides 180 of the triangular supporting member extend from the bottom of the wings to the bottom of the upper section of the upper compound truss. Terminal extended portions 181 of the ribs are secured to the upper truss at opposite sides thereof and their ends are connected with the inverted U-shaped portion at opposite sides thereof. This increases the depth of the trough and lessens the distance between the top of the same and the top of the body and reduced the degree of compression of the air displaced by the machine and drawn into the trough in the manner heretofore described. This form lessens the weight of the frame work and increases the parachute effect of the machine.

The inwardly tapered or flared ends of the longitudinal passage of the substantially segmental body with the pendent supporting means enables the flying machine to form an efficient parachute and will enable the same to descend slowly in an upright position.

What is claimed is:—

1. A flying machine of the class described including a body provided at opposite sides with depending wings forming a longitudinal passage or channel open at the bottom, said passage or channel being interiorly tapered at its front end and the taper being extended to substantially the top and sides of the body at the front end of the same for causing the air displaced by the body to be pressed rearwardly beneath the front end of the body into the channel or passage, gas bags located within the wings, and a frame disposed between the gas bags and having ribs or members extending beneath the said bags.

2. A flying machine of the class described including a body provided with a longitudinal trough open at the bottom and arranged to receive the air displaced by the body, said passage being tapered or flared at its front and rear ends and the taper being extended to the top and sides of the body at the front end of the same for causing all of the air displaced by the body to be pressed rearwardly under the same, gas bags located within the body at opposite sides thereof and a frame disposed between the gas bags and having ribs or members extending beneath the said bags and adapted to support the same when the flying machine is at rest.

3. A flying machine of the class described including a body provided at opposite sides with spaced depending longitudinal wings forming an intervening channel or passage open at the bottom and a supporting framework comprising a longitudinal truss located at the upper portion of the body and laterally extending ribs connected with the truss and having a loop formation sustaining the wings.

4. A flying machine of the class described including a body provided with spaced depending longitudinal wings forming a channel or passage open at the bottom and a supporting frame-work comprising a longitudinal truss located within the body above the channel or passage and ribs extending laterally from and connected with the truss and forming loops located within and sustaining the wings, and separate gas bags located within and carried by the loops of the ribs.

5. A flying machine of the class described including a body provided with spaced depending longitudinal wings defining a longitudinal passage or channel open at the bottom and interiorly tapered at the front end, a longitudinal truss located within the body above the passage or channel and extending to substantially the front end of the body and having a tapered front portion conforming to the taper of the body, and ribs located at opposite sides of and connected with the truss and having a loop formation arranged to sustain the wings.

6. A flying machine including a body provided with spaced longitudinal wings defining a channel or passage open at the bottom, said wings being rounded to present convex bottom surfaces located at opposite sides of the open bottom of the channel or passage and extending transversely from the same, gas bags located within the wings and a frame disposed between the gas bags and having ribs or members extending beneath the said bags.

7. A flying machine including a body provided with spaced longitudinal wings defining a longitudinal channel or passage open at the bottom and interiorly tapered at the front end to approximately the top and sides of the body, means located at the open bottom of the channel or passage for propelling the body and separate means located within the tapered channel or passage above the plane of the said means for rarifying the air in advance of the body whereby a front pack is prevented and the air displaced by the body forced under the same for supporting the body.

8. A flying machine of the class described including a substantially segmental body presenting curved exteriorly top and side faces and having a longitudinal trough or passage and interiorly tapered, the interior taper extending from the curved exterior faces of the body to the trough to form a substantially semi-funnel shaped entrance to the trough for causing all of the air displaced by the body to pass beneath the same and thereby prevent pressure on the exterior surface of the top and sides, gas bags located within the body at opposite sides thereof and a frame disposed between the gas bags and having ribs or members extending beneath the said bags.

9. A flying machine including a body provided at opposite sides with depending longitudinal wings forming a longitudinal trough or passage open at the bottom, and a frame comprising an upper longitudinal truss and transverse ribs secured to the truss and extending laterally from opposite sides of the same and defining loops conforming to the contour of the wings.

10. A flying machine including a body provided at opposite sides with depending longitudinal wings forming a channel or passage open at the bottom, and a frame comprising an upper longitudinal truss arranged within the body; interior transverse ribs connected with the truss and extending laterally from the same and conforming to the contour of the body, and an exteriorly arranged lower truss located at the open bottom of the passage or channel and connected with the lower portions of the said ribs.

11. A flying machine including a body provided at opposite sides with depending wings forming a passage or channel open at the bottom and a frame comprising an upper truss arranged within the body, interior transverse ribs defining loops at opposite sides of the body and conforming to the contour of the wings, and an exteriorly arranged truss located at the open bottom of the said channel or passage and connected with the ribs.

12. A flying machine including a substantially segmental body provided at opposite sides with depending longitudinal wings forming a longitudinal trough or passage open at the bottom, and a frame comprising an upper longitudinal truss arranged within the body, interior transverse ribs secured to the truss and extending laterally from the same and conforming to the contour of the body, and an exteriorly arranged truss located beneath and hung from the upper truss.

13. A flying machine including a substantially segmental body provided at opposite sides with depending longitudinal wings forming a longitudinal trough or passage open at the bottom, and a frame comprising an upper longitudinal truss arranged within the body, interior transverse ribs secured to the truss and extending laterally from the same and conforming to the contour of the body, and an exteriorly arranged longitudinal truss hung from the upper longitudinal truss and located below the trough or passage to permit the displaced air to pass between the said lower truss and the top of the trough or passage.

14. A flying machine including a body provided at opposite sides with depending longitudinal wings forming a longitudinal trough or passage open at the bottom, and a frame comprising an upper longitudinal truss arranged within the body, interior transverse ribs secured to the truss and extending laterally from the same and conforming to the contour of the body, and an exteriorly arranged longitudinal truss hung from the upper longitudinal truss and located below the trough or passage to permit the displaced air to pass between the said lower truss and the top of the trough or passage, and means for connecting the lower truss with the ribs at opposite sides of the trough or passage.

15. A flying machine including a substantially segmental body provided at opposite sides with depending longitudinal wings forming a longitudinal trough or passage open at the bottom, and a frame comprising an upper longitudinal truss arranged within the body, interior transverse ribs secured to the truss and extending laterally from the same and conforming to the contour of the body, and an exteriorly arranged longitudinal truss hung from the upper longitudinal truss and located below the trough or passage to permit the displaced air to pass between the said lower truss and the top of the trough or passage, and laterally projecting arms extending from the lower truss and connected with the body at the lower portions of the said wings.

16. A flying machine including a body provided at opposite sides with depending longitudinal wings forming a longitudinal trough or passage open at the bottom, and a frame comprising an upper longitudinal truss arranged within the body, interior transverse ribs secured to the truss and extending laterally from the same and defining loops and conforming to the contour of the wings and an exteriorly arranged longitudinal truss hung from the upper longitudinal truss and located below the trough or passage to permit the displaced air to pass between the said lower truss and the top of the trough or passage, and horizontal laterally projecting arms extending from the top of the lower truss to the bottom portions of the wings.

17. A flying machine including a substantially segmental body provided at opposite sides with depending longitudinal wings forming a longitudinal trough or passage open at the bottom, and a frame comprising an upper longitudinal truss arranged within the body, interior transverse ribs secured to the truss and extending laterally from the same and conforming to the contour of the body, and an exteriorly arranged lower longitudinal truss hung from the upper truss and having tapered terminal portions.

18. A flying machine of the class described including a substantially segmental body provided with opposite depending wings forming a longitudinal trough and tapered interiorly at the ends of the truss and a frame comprising an upper longitudinal trough having tapered end portions, transverse ribs conforming to the contour of the body and secured to and extending laterally from the upper longitudinal truss and an exteriorly arranged longitudinal truss hung from the upper truss and having tapered terminal portions.

19. A flying machine of the class described including a substantially segmental body having depending wings forming a longitudinal trough or passage, a frame comprising an upper longitudinal truss, ribs secured to the truss and extending laterally from opposite sides of the same and an exteriorly arranged longitudinal truss hung from the upper truss and located at the bottom of the said trough or passage, and a propeller mounted upon the exterior truss and operating in the trough or passage.

20. A flying machine of the class described including a substantially segmental body having depending side wings forming a longitudinal trough or passage, the ends of the trough or passage being tapered, a frame having an exterior truss located beneath the said passage, end propellers hung from the frame and operating in the tapered ends of the said trough or passage, and main propellers mounted upon the exterior truss and operating in the trough or passage.

21. A flying machine of the class described including a body having depending side wings forming a longitudinal trough or passage, the ends of the trough or passage being tapered, a frame having an exterior truss located beneath the said passage, and a cabin mounted in the exterior truss below the longitudinal trough or passage.

22. A flying machine of the class described including a body having depending side wings forming a longitudinal trough or passage, the ends of the trough or passage being tapered, a frame having an exterior truss located beneath the said passage, a cabin mounted in the lower truss below the longitudinal trough or passage, and a propeller mounted upon the said exterior truss above the cabin and operated within the longitudinal trough.

23. A flying machine of the class described including a body having depending side wings forming a longitudinal trough or passage, a frame comprising an upper longitudinal truss, ribs secured to and extending laterally from the said truss and a lower exteriorly arranged longitudinal truss connected with the ribs, and a propeller mounted upon the lower truss and operating at the trough or passage.

24. A flying machine of the class described including a body having depending side wings forming a longitudinal trough or passage, the ends of the trough or passage being tapered, a frame comprising an upper longitudinal truss, ribs secured to and extending laterally from the said truss and a lower exteriorly arranged longitudinal truss connected with the ribs, and a cabin mounted in the lower truss below the longitudinal passage.

25. A flying machine of the class described including a body having depending side wings forming a longitudinal trough or passage, a frame comprising an upper longitudinal truss, ribs secured to and extending laterally from the said truss and defining loops conforming to the contour of the wings and a lower exteriorly arranged longitudinal truss connected with the ribs, a cabin mounted in the lower truss below the longitudinal passage, and a propeller mounted upon the lower truss above the cabin and operating within the longitudinal trough or passage.

26. A flying machine of the class described including a body provided at the bottom with a channel or passage open at the bottom, gas bags located within the body at opposite sides thereof and a frame disposed between the gas bags and having ribs or members extending beneath the said bags and adapted to support the same when the flying machine is at rest.

27. A flying machine of the class described including a body having spaced depending wings forming an intervening channel or passage open at the bottom, and a frame comprising an upper truss arranged within the body and extending longitudinally of the same above the channel or passage, ribs connected with the truss and defining loops within the wings for sustaining the same, and exteriorly arranged means connecting the ribs at opposite sides of the channel or passage and located at the open bottom of the same.

28. A flying machine of the class described including a body having longitudinal wings forming a bottom trough or passage, said trough or passage being open at the bottom and said body being tapered at the front end, and a frame comprising an upper truss extending to the front end of the body and tapered to correspond with the taper of the body, transverse ribs conforming to the contour of the body and secured to and extending laterally from the sides of the truss, and an exterior truss hung from the upper truss and having tapered end portions.

29. A flying machine of the class described including a body having side wings and an intervening channel or passage open at the bottom, an upper central longitudinal truss within the upper portion of the body, transverse ribs connected with the truss and defining loops at the said wings, and a covering supported by the ribs.

30. A flying machine of the class described including a body having spaced side wings and a longitudinal channel or passage open at the bottom, an upper truss extending longitudinally of the body within the upper portion of the same, transverse ribs connected with the truss and defining loops within the wings and conforming to the contour of the same, longitudinal members connecting the ribs and a covering supported by the ribs.

31. A flying machine of the class described including a body having side wings and a longitudinal bottom trough, comprising a frame having ribs composed of inner and outer members arranged in spaced relation and a covering supported by the ribs, an inner imperforate inner skin supported by the ribs and spaced from the covering, and a gas bag arranged within the inner skin.

32. A flying machine of the class described including a substantially segmental body having side wings and a longitudinal bottom trough and comprising a frame having ribs conforming to the contour of the body and composed of inner and outer members arranged in spaced relation, and adjustable devices connecting the members of the ribs and maintaining the same in such spaced relation, and a covering supported by the ribs.

33. A flying machine of the class described including a substantially segmental body having side wings and a longitudinal bottom trough and comprising a frame comprising ribs conforming to the contour of the body and composed of a pair of inner members and an outer member and a covering supported by the ribs.

34. A flying machine of the class described including a substantially segmental body having side wings and a longitudinal bottom trough and comprising a frame comprising ribs conforming to the contour of the body and composed of a pair of inner members and an outer member, adjustable devices connecting the members of the ribs and arranged in triangular formation and a covering supported by the ribs.

35. A flying machine of the class described including a body having side wings and a longitudinal bottom trough and comprising a frame comprising ribs looped within the wings and conforming to the contour of the body, longitudinal members extending between the ribs, and couplings having sockets and connecting the longitudinal members to the ribs, and a covering supported by the ribs.

36. A flying machine of the class described including a substantially segmental body having side wings and a longitudinal bottom trough and comprising a frame comprising ribs conforming to the contour of the body and having inner and outer longitudinal frame members extending between the ribs and inner and outer couplings having sockets connecting the members of the ribs with the longitudinal frame members, and a covering supported by the ribs and the longitudinal members.

37. A flying machine of the class described including a substantially segmental body having side wings and a longitudinal bottom trough and comprising a frame comprising ribs conforming to the configuration of the body and having a single outer member and a pair of inner members, inner longitudinal frame members arranged in pairs, outer single longitudinal frame members, and single and double couplings having sockets and connecting the inner members of the ribs with the inner frame members and the outer members of the ribs with the outer frame members and a covering.

38. A flying machine of the class described including a substantially segmental body having side wings and a longitudinal bottom trough and comprising a frame comprising ribs conforming to the configuration of the body and having a single outer member and a pair of inner members, inner longitudinal frame members arranged in pairs, outer single longitudinal frame members, and adjustable devices connecting the inner and outer members of the ribs and the inner and outer frame members and arranged in triangular formation, and a covering supported by the frame.

39. A flying machine of the class described including a substantially segmental body having side wings and a longitudinal bottom trough and comprising a frame having ribs composed of inner and outer members, the inner members being extended at intervals to form transverse bracing elements, and a covering supported by the frame.

40. A flying machine of the class described including a substantially segmental body having side wings and a longitudinal bottom trough and comprising a frame having ribs composed of inner and outer members, the inner members being extended at intervals to form inclined vertical and horizontal transverse bracing elements and a covering supported by the frame.

41. A flying machine of the class described including a substantially segmental body having side wings and a longitiudinal bottom trough and comprising a frame, an upper longitudinal truss, transverse ribs secured to and extending from opposite sides of the truss and conforming to the contour of the body, said ribs being composed of inner and outer members arranged in spaced relation and inner and outer longitudinal frame members connecting the ribs, and a covering arranged on the frame.

42. A flying machine of the class described including a substantially segmental body having side wings and a longitudinal bottom trough and comprising a frame, comprising an upper longitudinal truss, transverse ribs conforming to the configuration of the body and secured to and extending laterally from the upper truss and having inner and outer members, the inner members being arranged in pairs, inner and outer longitudinal frame members connecting the ribs, the inner frame members being also arranged in pairs, and a covering supported by the frame.

43. A flying machine of the class described including a substantially segmental body having side wings and a longitudinal bottom trough and comprising a frame, comprising an upper longitudinal truss, transverse ribs conforming to the configuration of the body and secured to and extending laterally from the upper truss and having inner and outer members, the inner members being arranged in pairs, inner and outer longitudinal frame members connecting the ribs, the inner frame members being also arranged in pairs, and the inner rib members being extended at intervals to form transverse bracing elements and a covering supported by the frame.

44. A flying machine of the class described including a substantially segmental body having side wings and a longitudinal bottom trough and comprising a frame, an upper longitudinal truss, transverse ribs conforming to the contour of the body, extending laterally from opposite sides of the longitudinal truss and having upper terminal portions arranged at opposite sides of and secured to the truss and longitudinal frame members connecting the ribs, and a covering supported by the frame.

45. A flying machine of the class described including a substantially segmental body having side wings and a longitudinal bottom trough and comprising a frame, an upper longitudinal truss, transverse ribs conforming to the contour of the body, extending laterally from opposite sides of the longitudinal truss and having upper terminal portions arranged at opposite sides of and secured to the truss arched connecting members extending across the top of the truss and connected with the ribs at opposite sides of the same and longitudinal frame members connecting the ribs, and a covering supported by the frame.

46. A flying machine of the class described including a substantially segmental body having side wings and a longitudinal bottom trough and comprising a frame including an upper longitudinal truss, transverse ribs conforming to the contour of the body and secured to and extending from opposite sides of the truss, a triangular bracing and supporting element having its apex located beneath and connected with the truss, said bracing and supporting element being also connected at the base with the ribs at the bottoms of the wings, and a covering supported by the frame.

47. A flying machine of the class described including a substantially segmental body having side wings and a longitudinal bottom trough and comprising a frame including an upper longitudinal truss, transverse ribs conforming to the contour of the body and secured to and extending from opposite sides of the truss, a triangular bracing and supporting element having its apex located beneath and connected with the truss, said bracing and supporting element being also connected at the base with the ribs at the bottom of the wings, inclining bracing elements diverging upwardly from the apex of the said triangular element and connected at their outer terminals with the ribs and forming an inverted approximately triangular bracing and supporting element, and a covering supported by the frame.

48. A flying machine of the class described including a substantially segmental body having side wings and a longitudinal bottom trough and comprising a frame including an upper longitudinal truss, transverse ribs conforming to the contour of the body and secured to and extending from opposite sides of the truss, a triangular bracing and supporting element having its apex located beneath and connected with the truss, said bracing and supporting element being also connected at the base with the ribs at the bottom of the wings, vertical and horizontal bracing members connecting the triangular bracing element with the ribs, and a covering supported by the frame.

49. A flying machine of the class described including a substantially segmental body having side wings and a longitudinal bottom trough and comprising a frame including an upper longitudinal truss, transverse ribs conforming to the contour of the body and secured to and extending from opposite sides of the truss, a triangular bracing and supporting element having its apex located beneath and connected with the truss, said bracing and supporting element being also connected at the base with the ribs at the bottom of the wings, inclined bracing members extending from the sides of the triangular element to the ribs and a covering supported by the frame.

50. A flying machine of the class described including a substantially segmental body having side wings and a longitudinal bottom trough and comprising a frame including an upper longitudinal truss, and transverse ribs conforming to the configuration of the body and secured to and extending laterally from the truss, transverse connecting members extending across the top of the truss and secured at their terminals to the ribs, longitudinal frame members connecting the ribs and arched longitudinal connecting members secured at their terminals to the contiguous frame members.

51. A flying machine of the class described including a body having side wings and a longitudinal channel or passage open at the bottom, said body being also provided at the top with a pilot house, gas bags located within the body at opposite sides thereof and a frame disposed between the gas bags and having ribs or members extending beneath the said bags, said frame being connected with and sustaining the pilot house.

52. A flying machine of the class described including a substantially segmental body having side wings and a longitudinal channel or passage open at the bottom, said body being also provided at the top with a pilot house, gas bags located within the body at opposite sides thereof and a frame disposed between the gas bags and having ribs or members extending beneath the said bags, said frame being connected with and sustaining the pilot house and having a convex outer surface merging into the exterior surface of the body.

53. A flying machine of the class described including a substantially segmental body having side wings and a longitudinal bottom trough and comprising an upper longitudinal truss and transverse ribs conforming to the configuration of the body and extending from opposite sides of the truss and the pilot house arranged at the top of the body and tapered transversely and carried by the said truss and ribs.

54. A flying machine of the class described including a substantially segmental body having side wings and a longitudinal bottom trough and comprising an upper longitudinal truss, transverse ribs conforming to the configuration of the body and extending from opposite sides of the truss and a pilot house arranged at the top of the body and tapered longitudinally and transversely and carried by the said truss and ribs, said pilot house having an exterior convex surface merging into the outer surface of the body.

55. A flying machine including a body having a longitudinal channel or passage open at the bottom and comprising an inner skin, an outer skin or covering spaced from the inner skin to provide intervening space, gas bags arranged within the inner skin at opposite sides of the body and a frame disposed between the gas bags and having ribs or members extending laterally beneath these said bags and adapted to support the same when the flying machine is at rest.

56. A flying machine of the class described including a substantially segmental body having side wings and a longitudinal bottom trough and comprising a longitudinal truss, transverse ribs conforming to the configuration of the body and connected to and extending from opposite sides of the truss and composed of inner and outer members, inner and outer longitudinal frame members connecting the inner and outer members of the ribs, an inner skin, and an outer skin or covering, said inner skin and outer skin or covering being supported in spaced relation by the inner and outer members of the ribs and the inner and outer longitudinal members.

57. A flying machine of the class described including a substantially segmental body having side wings and a longitudinal bottom trough and comprising a longitudinal truss, transverse ribs conforming to the configuration of the body and connected to and extending from opposite sides of the truss and composed of inner and outer members, inner and outer longitudinal frame members connecting the inner and outer members of the ribs, an inner skin arranged against the inner members of the ribs and the inner frame members and an outer skin or covering arranged on the outer members of the ribs and the outer frame members.

58. A flying machine of the class described including a substantially segmental body having side wings and a longitudinal bottom trough and comprising a frame having ribs conforming to the configuration of the body and an outer covering composed of a fabric portion located at the top and sides of the body and a sheet metal portion located at and constituting the walls of the bottom trough.

59. A flying machine of the class described including a substantially segmental body having side wings and a longitudinal bottom trough and comprising a frame having ribs conforming to the configuration of the body and composed of inner and outer transverse members, and inner and outer longitudinal frame members connecting the inner and outer transverse members of the ribs, an inner skin, an outer skin or covering, said inner skin and outer skin or covering being supported in spaced relation by the ribs and the longitudinal frame members and transverse tension cables extending around the body in the space between the inner and the outer skin or covering and arranged on the inner members of the frame.

60. A flying machine of the class described including a substantially segmental body having side wings and a longitudinal bottom trough and comprising a frame having ribs conforming to the configuration of the body and composed of inner and outer members, an upper longitudinal truss arranged within the body and connecting the ribs, inner and outer longitudinal frame members also connecting the ribs, a lower exterior longitudinal truss connected with the upper truss and the ribs, an inner skin or covering an outer skin or covering, said inner skin and outer skin or covering being supported in spaced relation by the ribs and longitudinal frame members and tensioning cables extending around the body at intervals and connected with the lower longitudinal truss.

61. A flying machine of the class described including a substantially segmental body having side wings and a longitudinal bottom trough and comprising an upper longitudinal truss arranged within the body, transverse ribs conforming to the configuration of the body and connected to and extending from opposite sides of the upper truss, a lower longitudinal truss connected with the upper truss and with the ribs and longitudinal tension cables connected with the ends of the upper truss and with the ribs at the bottom portions of the wings.

62. A flying machine of the class described including a substantially segmental body having side wings and a longitudinal bottom trough and comprising an upper longitudinal truss arranged within the body, transverse ribs conforming to the configuration of the body and connected to and extending from opposite sides of the said truss, a lower exterior truss hung from the upper truss and connected with the ribs, transverse tension cables arranged at intervals and extending around the body and connected with the bottom truss and longitudinal tension tables connected with the ends of the upper truss and with the ribs at the lower portions of the wings.

63. A flying machine of the class described including a substantially segmental body having side wings and a longitudinal bottom trough and comprising an upper longitudinal truss, transverse ribs connected with and extending from opposite sides of the truss and conforming to the configuration of the body, said ribs being composed of inner and outer members, inner and outer frame members connecting the inner and outer members of the ribs and exterior longitudinal bottom truss hung from the upper truss and connected with the ribs, an inner skin and an outer skin or covering supported in spaced relation by the said ribs and the longitudinal frame members, transverse tension cables extending around the body in the space between the inner skin and the outer skin or covering and arranged on the longitudinal frame members and longitudinal tension cables connected with the ends of the upper truss and with the ribs at the lower portions thereof.

64. A flying machine of the class described including a substantially segmental body having side wings and a longitudinal bottom trough and comprising an upper longitudinal truss, transverse ribs connected with and extending from opposite sides of the truss and composed of inner and outer members, inner and outer frame members connecting the inner and outer members of the ribs, an exterior longitudinal bottom truss hung from the upper truss and connected with the ribs, an inner skin, an outer skin or covering, said inner skin and outer skin or covering being supported in spaced relation by the said ribs and frame members, transverse tension cables extending around the body in the space between the inner skin and outer skin or covering and arranged on the inner frame members, other transverse tension cables extending around the body and carried by the ribs and longitudinal tension cables connected with the ends of the upper truss and with the ribs at the lower portions thereof.

65. A flying machine of the class described including a substantially segmental body having side wings and a longitudinal bottom trough and comprising a frame having transverse ribs conforming to the configuration of the body, transverse tension cables extending around the body at intervals and longitudinal tension cables connected with the frame at the ends thereof and with the ribs at the lower portions of the same.

66. A flying machine of the class described including a substantially segmental body having side wings and a longitudinal bottom trough and comprising a frame having transverse ribs and provided with an exterior longitudinal truss located below the said trough and transverse tension cables extending around the body and connected with the lower truss.

67. A flying machine of the class described including a segmental body having side wings and a longitudinal bottom trough and comprising a frame having transverse ribs and provided with an exterior longitudinal truss located below the trough and provided with arms extending to and connected with the ribs at the bottoms of the wings and transverse tension cables extending around the body and connected with the lower truss.

68. A flying machine of the character described including a substantially segmental body having side wings and a longitudinal bottom trough and comprising an upper longitudinal truss, transverse ribs conforming to the configuration of the body, an inner skin composed of two sections located within the ribs at opposite sides of the longitudinal truss, and spaced apart by same, and an outer skin or covering supported by and arranged exteriorly of the ribs.

69. A flying machine of the character described including a substantially segmental body having side wings and a longitudinal bottom trough and comprising an upper longitudinal truss, transverse ribs conforming to the configuration of the body, an inner skin composed of two sections located within the ribs at opposite sides of the longitudinal truss, and spaced apart by same, and an outer skin or covering supported by and arranged exteriorly of the ribs and extending over the upper truss at the space between the inner skin section.

70. A flying machine of the character described including a substantially segmental body having side wings and a longitudinal bottom trough and comprising an upper longitudinal truss, transverse ribs conforming to the configuration of the body, an inner skin composed of two sections located within the ribs at opposite sides of the longitudinal truss, and spaced apart by same, and an outer skin or covering supported by and arranged exteriorly of the ribs and extending over the upper truss at the space between the inner skin section, said outer skin or covering having extensions located at opposite sides of the upper truss and extending to the top of said trough.

71. A flying machine of the class described including a body provided at the bottom with a longitudinal passage open at the lower portion, gas bags located within the body at opposite sides thereof, a frame disposed between the gas bags and having ribs or members extending beneath the gas bags and a car connected with the said frame and suspended from the body below the longitudinal channel or passage.

72. A flying machine of the class described including a substantially segmental body having a longitudinal channel or passage open at the lower portion enlarged at the terminals, gas bags located within the body at opposite sides thereof, a longitudinal frame disposed between the gas bags and having ribs or members extending beneath the said bags and a car connected with the frame and hung from the body whereby the latter is adapted to operate as a parachute.

73. A flying machine of the class described including a body having depending wings forming a longitudinal passage or channel open at the bottom, an interior frame provided with ribs forming loops within the wings at opposite sides of the channel or passage, an exterior framework located at the bottom of the channel or passage, and means for connecting the exterior framework with the interior framework at the lower portions of the said ribs.

74. A flying machine of the class described including a body having depending wings forming a longitudinal passage or channel open at the bottom, an interior frame provided with ribs forming loops within the wings at opposite sides of the channel or passage, an exterior longitudinal truss located at the open bottom of the channel or passage and connected with the interior framework at the lower portions of the ribs.

75. A flying machine of the class described including a body provided with spaced depending wings forming a longitudinal channel or passage open at the bottom, an interior framework having ribs looped at opposite sides of the channel or passage for sustaining the wings, gas bags arranged within the loops of the ribs, and an exterior longitudinal framework located below the channel or passage and connected with the interior framework and adapted to support propelling means, said framework constituting a lower weighted portion and the said body having inclined faces at the ends of the channel or passage whereby the flying machine is adapted to operate as a parachute in descending and also as an aeroplane in gliding.

In testimony whereof I affix my signature.

THOMAS M. FINLEY.